United States Patent
Sugihara et al.

(10) Patent No.: US 12,509,567 B2
(45) Date of Patent: Dec. 30, 2025

(54) LIQUID COMPOSITION SET, POROUS RESIN MANUFACTURING APPARATUS, AND POROUS RESIN MANUFACTURING METHOD

(71) Applicants: Naoki Sugihara, Kanagawa (JP); Keigo Takauji, Kanagawa (JP); Daisuke Nose, Kanagawa (JP); Miku Ohkimoto, Kanagawa (JP); Toru Ushirogochi, Kanagawa (JP)

(72) Inventors: Naoki Sugihara, Kanagawa (JP); Keigo Takauji, Kanagawa (JP); Daisuke Nose, Kanagawa (JP); Miku Ohkimoto, Kanagawa (JP); Toru Ushirogochi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 907 days.

(21) Appl. No.: 17/454,065

(22) Filed: Nov. 9, 2021

(65) Prior Publication Data
US 2022/0169821 A1    Jun. 2, 2022

(30) Foreign Application Priority Data
Nov. 30, 2020    (JP) .................. 2020-197838

(51) Int. Cl.
| | | |
|---|---|---|
| C08J 9/28 | (2006.01) | |
| C09D 11/033 | (2014.01) | |
| C09D 11/101 | (2014.01) | |
| C09D 11/102 | (2014.01) | |
| C09D 11/107 | (2014.01) | |

(52) U.S. Cl.
CPC .............. *C08J 9/28* (2013.01); *C09D 11/033* (2013.01); *C09D 11/101* (2013.01); *C09D 11/102* (2013.01); *C09D 11/107* (2013.01); *C08J 2201/0502* (2013.01); *C08J 2335/02* (2013.01); *C08J 2371/00* (2013.01)

(58) Field of Classification Search
CPC .............. B41M 5/0023; B41M 5/0047; B41M 5/0064; C08F 2/44; C08F 2/48; C08J 9/28; C08J 9/286; C08J 2201/0502; C08J 2333/06; C08J 2335/00; C08J 2335/02; C08J 2371/00; C09D 11/033; C09D 11/101; C09D 11/102; C09D 11/107; C09D 11/30; C09D 11/36
See application file for complete search history.

(56) References Cited

U.S. PATENT DOCUMENTS

| | | | | |
|---|---|---|---|---|
| 6,271,285 B1 * | 8/2001 | Miyabayashi | ............ | C08F 8/44 |
| | | | | 526/307.6 |
| 2008/0075837 A1 | 3/2008 | Bower | | |
| 2011/0312190 A1 | 12/2011 | Ichino et al. | | |
| 2015/0056422 A1 | 2/2015 | Bastin et al. | | |
| 2019/0190027 A1 | 6/2019 | Takeshita et al. | | |
| 2020/0207881 A1 | 7/2020 | Ohkimoto et al. | | |
| 2021/0202953 A1 | 7/2021 | Takauji et al. | | |

FOREIGN PATENT DOCUMENTS

| | | |
|---|---|---|
| CN | 101048238 | 10/2007 |
| CN | 102289151 | 12/2011 |
| CN | 102438762 | 5/2012 |
| CN | 104364021 | 2/2015 |
| CN | 108630863 | 10/2018 |
| CN | 111378199 | 7/2020 |
| JP | 2002-200841 | 7/2002 |
| JP | 2004-051783 | 2/2004 |
| JP | 2019-151062 | 9/2019 |
| JP | 2020070362 | 5/2020 |
| JP | 2020084096 | 6/2020 |
| JP | 2021-088691 | 6/2021 |
| WO | 2010/134627 | 11/2010 |

OTHER PUBLICATIONS

JP 2020-084096 Translation (Year: 2020).*
Chinese Office Action dated Sep. 12, 2023, in Chinese Application No. 202111439651.7, 8 pages.
Li et al., "Fine Chemical Production Technology", Jan. 31, 2014, with partial English translation, 7 pages.
Wanqiang Zhu, "Basic Course of Coatings", Jun. 30, 2012, with English translation, 4 pages.
Chinese Office Action dated Nov. 2, 2022, in Chinese Patent Application No. 202111439651.7, 9 pages.
Liao Wensheng, 液体洗浄剤 新原料・新配方, "Liquid Detergent Xinyuan, New formula of material", Chemical Industry Press, Jan. 31, 2001, 4 pages.
Zhang Mingzhi et al., 鋳造詞典, "The Foundry Dictionary", China Agricultural Machinery Publishing, Apr. 30, 1986, 3 pages.
Xiao Xuezhi et al., 含 HCFCs 替代技術指南, Hydrochlorofluorocarbons (HCFCs) Alternative Technical Guide, China Environmental Press, Jun. 30, 2016, 3 pages.
Korean Office Action dated Apr. 21, 2023, in Korean Application No. 10-2021- 0165737, with English translation, 9 pages.
Chinese Office Action dated May 11, 2023, in Chinese Application No. 202111439651.7, 7 pages.
Extended European Search Report dated Apr. 29, 2022 in European Application No. 21207449.6, 7 pages.

* cited by examiner

*Primary Examiner* — John M Cooney

(74) *Attorney, Agent, or Firm* — Grüneberg and Myers PLLC

(57) ABSTRACT

A liquid composition set is provided. The liquid composition set comprises: a liquid composition X comprising a polymerizable compound X and a solvent X; and a liquid composition Y comprising a solvent Y. The liquid composition X is to form a porous resin, and has a smaller surface tension than the liquid composition Y.

17 Claims, 1 Drawing Sheet

LIQUID COMPOSITION SET, POROUS RESIN MANUFACTURING APPARATUS, AND POROUS RESIN MANUFACTURING METHOD

CROSS-REFERENCE TO RELATED APPLICATIONS

This patent application is based on and claims priority pursuant to 35 U.S.C. § 119(a) to Japanese Patent Application No. 2020-197838, flied on Nov. 30, 2020, in the Japan Patent Office, the entire disclosure of which is hereby incorporated by reference herein.

BACKGROUND

Technical Field

The present disclosure relates to a liquid composition set, a porous resin manufacturing apparatus, and a porous resin manufacturing method.

Description of the Related Art

Generally, porous resins can be utilized in a variety of applications. As an example, a porous resin can provide a separation layer that transmits or blocks only a specific substance by appropriately selecting the shape and size of the pores, surface properties of the frame portion, etc., of the porous resin. As another example, a porous resin can provide an efficient reaction field or storage place for gases or liquids taken in from the outside by utilizing the vast surface area and void volume of the porous resin. Therefore, if it is possible to provide a liquid composition for forming a porous resin which has excellent handleability and applicability to various places, the applications of the porous resin is greatly expanded.

SUMMARY

In accordance with some embodiments of the present invention, a liquid composition set, a porous resin manufacturing apparatus, and a porous resin manufacturing method are provided.

The liquid composition set comprises: a liquid composition X comprising a polymerizable compound X and a solvent X; and a liquid composition Y comprising a solvent Y The liquid composition X is to form a porous resin, and has a smaller surface tension than the liquid composition Y.

The porous resin manufacturing apparatus comprises: an accommodating container Y accommodating a liquid composition Y; an application device Y configured to apply the liquid composition Y accommodated in the accommodating container Y; an accommodating container X accommodating a liquid composition X; an application device X configured to apply the liquid composition X accommodated in the accommodating container X to a region to which the liquid composition Y has been applied; and a curing device configured to cure the liquid composition X having been applied, where the liquid composition X has a smaller surface tension than the liquid composition Y.

The porous resin manufacturing method comprises: applying a liquid composition Y; applying a liquid composition X to a region to which the liquid composition Y has been applied; and curing the liquid composition X having been applied, where the liquid composition X has a smaller surface tension than the liquid composition Y.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
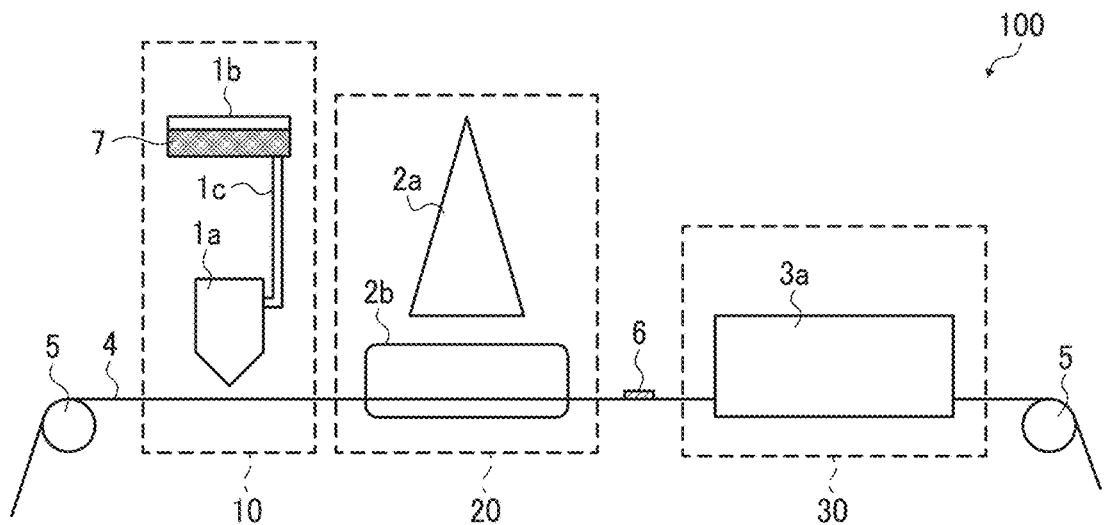
FIG. 1 is a schematic diagram illustrating a porous resin manufacturing apparatus that performs a porous resin manufacturing method according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In accordance with some embodiments of the present invention, a liquid composition set containing a liquid composition for forming a porous resin and another liquid composition is provided. The liquid composition set forms a porous resin having excellent surface uniformity even when the liquid composition for forming the porous resin comes into contact with the other liquid composition.

Hereinafter, one embodiment of the present invention is described.

Liquid Composition Set

The liquid composition set contains a liquid composition X and a liquid composition Y, and may optionally contain other liquid compositions as needed. In the liquid composition set, the liquid composition X and the liquid composition Y are each independently present in a liquid state. The liquid composition set is not limited to a combined body of a container filled with the liquid composition X and another container filled with the liquid composition Y. The concept of the liquid composition set involves a case in which the liquid composition X and the liquid composition Y are respectively contained in independent containers, which assumes combined use of the liquid composition X and the liquid composition Y, or substantially induces combined use of the liquid composition X and the liquid composition Y. The liquid composition X and the liquid composition Y are liquids having different compositions.

The liquid composition set contains the liquid compositions X and Y At least one of the liquid compositions X and Y contains a polymerizable compound. As the polymerizable compound is cured (polymerized), a porous resin is formed. Therefore, the liquid composition set is preferably used for forming a porous resin. The meaning of "the liquid composition set forms a porous resin" is not particularly limited as long as the porous resin is formed as a result of using the liquid composition set in a manner that the liquid composition X and the liquid composition Y come into contact with each other. Specifically, for example, the following case is included in the meaning of "the liquid composition set forms a porous resin": a case in which the liquid composition X and the liquid composition Y are applied in a manner that they come into contact with each other, and as a result, the porous resin is formed only in a region to which the liquid composition X has been applied and another region where the liquid composition X and the liquid composition Y have come into contact with each other, and no porous resin is formed in a region to which the liquid composition Y has been applied (excluding the region where the liquid composition X and the liquid composition Y have come into contact with each other). More specifically, for example, the following case is also included in the meaning of "the liquid composition set forms a porous resin": a case in which a material that forms a porous resin by curing (polymerizing), such as a polymerizable compound, is included in the liquid composition X but not included in the liquid composition Y, and as a result, the porous resin is formed as a result of using the liquid composition set.

The meaning of "the liquid composition set forms a porous resin" includes a case in which a part of components (e.g. polymerizable compound) of the liquid compositions contained in the liquid composition set is cured (polymerized) to form a porous resin hut the remaining parts of components (e.g., solvents) of the liquid compositions contained in the liquid composition set are not cured to form no porous resin.

The liquid composition set contains a liquid composition for forming a porous resin and another liquid composition. The liquid composition set is used for an application in which the liquid composition for forming a porous resin is to be brought into contact with the other liquid composition. A reason why the liquid composition set of the present disclosure is preferably used in such a case is described below.

There is a concern that the surface uniformity of the resultant porous resin may be lowered if a liquid composition for forming a porous resin comes into contact with another liquid composition. The concern increases in a case in which the liquid composition for forming a porous resin is applied to a porous substrate to form a porous resin on the porous substrate. In such a case, for the purpose of suppressing permeation of the liquid composition for forming a porous resin into the porous substrate in forming a porous resin on the porous substrate, another liquid composition is applied to the porous substrate in advance. However, if the surface tensions of the liquid composition for forming a porous resin and said another liquid composition are not appropriately adjusted, the surface uniformity of the resultant porous resin may be lowered when the liquid composition for forming a porous resin comes into contact with said another liquid composition. Specific cases in which the surface uniformity of the porous resin is low include a case in which small holes (pinholes) are generated in a partial region of the porous resin and the underlying porous substrate is thereby exposed. Details of the liquid composition set of the present disclosure, which forms a porous resin having excellent surface uniformity even when the liquid composition for forming a porous resin and the other liquid composition come into contact with each other, are described below Specifically, details of the liquid composition X serving as the liquid composition for forming a porous resin and the liquid composition Y serving as the other liquid composition are described below.

Liquid Composition X

The liquid composition X is a liquid used in combination with the liquid composition Y. The liquid composition X is preferably applied to a region to which the liquid composition Y has been applied. The liquid composition X is a liquid capable of forming a porous resin even when used alone in other words, even when not used in combination with the liquid composition Y). The liquid composition set is capable of forming a porous resin because of containing the liquid composition X. In the following descriptions, a resin formed from the liquid composition X alone is referred to as a resin X, and a porous body of the resin X is referred to as a porous resin X. The meaning of "the liquid composition X forms the porous resin X" includes a case in which a part of components (e.g., polymerizable compound X) of the liquid composition X is cured (polymerized) to form the porous resin X but the remaining parts of components (e.g., solvent X) of the liquid composition X are not cured to form no porous resin X.

The liquid composition X contains a polymerizable compound X and a solvent X, and optionally other components such as a polymerization initiator and a surfactant.

Polymerizable Compound X

The polymerizable compound X forms the resin X by polymerizing. The polymerizable compound X forms the porous resin X by polymerizing in the liquid composition X. The resin X formed from the polymerizable compound X is preferably a resin having a network structure formed by application of active energy rays (e.g., irradiation with light, application of heat). Preferred examples thereof include, but are not limited to, acrylate resins, methacrylate resins, urethane acrylate resins, vinyl ester resins, unsaturated polyester resins, epoxy resins, oxetane resins, vinyl ether resins, and resins formed by an enethiol reaction. Since the use of radical polymerization having high reactivity is preferred, acrylate resins, methacrylate resins, and urethane acrylate resins, which are formed from the polymerizable compound X having an unsaturated hydrocarbon group, particularly a (meth)acryloyl group, are preferred. From the viewpoint of productivity, vinyl ester resins, which are formed from the polymerizable compound X having a vinyl group, are more preferred. Each of these can be used alone or in combination with others. When two or more resins are used in combination, the combination of the resins is not particularly limited and can be suitably selected to suit to a particular application. Preferred examples thereof include combinations of urethane acrylate resins as main components with other resins, for the purpose of imparting flexibility. In the present disclosure, a polymerizable compound having an acryloyl group or a methacryloyl group is referred to as a polymerizable compound having a (meth)acryloyl group.

The active energy rays are not particularly limited as long as they can impart energy necessary for proceeding a polymerization reaction of the polymerizable compound X in the liquid composition X, Examples thereof include, but are not limited to, ultraviolet rays, electron beams, α-rays, β-rays, γ-rays, and X-rays. Among these, ultraviolet rays are preferred. Particularly when a high-energy light source is used, the polymerization reaction can proceed without using any polymerization initiator.

Preferably, the polymerizable compound X has at least one radical-polymerizable functional group such as an unsaturated hydrocarbon group. More preferably, the polymerizable compound X has two or more unsaturated hydrocarbon groups. Examples thereof include, but are not limited to, monofunctional, difunctional, and trifunctional or higher radical-polymerizable compounds, functional monomers, and radical-polymerizable oligomers. Among these compounds, difunctional or higher radical-polymerizable compounds are preferred.

Specific examples of the monofunctional radical-polymerizable compounds include, but are not limited to, 2-(2-ethoxyethoxy)ethyl acrylate, methoxypolyethylene glycol monoactylate, methoxypolyethylene glycol monomethacrylate, phenoxypolyethylene glycol acrylate, 2-acryloyloxyethyl succinate, 2-ethylhexyl acrylate, 2-hydroxyethyl acrylate, 2-hydroxypropyl acrylate, tetrahydrofurfuryl acrylate, 2-ethylhexylcarbitol acrylate, 3-methoxybutyl acrylate, benzyl acrylate, cyclohexyl acrylate, isoamyl acrylate, isobutyl acrylate, methoxytriethylene glycol acrylate, phenoxytetraethylene glycol acrylate, cetyl acrylate, isostearyl acrylate, stearyl acrylate, and styrene monomer. Each of these can be used alone or in combination with others.

Specific examples of the difunctional radical-polymerizable compounds include, but are not limited to, 1,3-butanediol diacrylate, 1,4-butanediol diacrylate, 1,4-butanediol dimethacrylate, 1,6-hexanediol diacrylate, 1,6-hexanediol dimethacrylate, diethylene glycol diacrylate, polyethylene glycol diacrylate, neopentyl glycol diacrylate, EO-modified bisphenol A diacrylate, EO-modified bisphenol F diacrylate, neopentyl glycol diacrylate, and tricyclodecane, dimethanol diacrylate. Each of these can be used alone or in combination with others.

Specific examples of the trifunctional or higher radical-polymerizable compounds include, but are not limited to, trimethylolpropane triacrylate (TMPTA), trimethylolpropane trimethacrylate, EO-modified trimethylolpropane triacrylate, PO-modified trimethylolpropane triacrylate, caprolactone-modified trimethylolpropane triacrylate, HPA-modified trimethylolpropane trimethacrylate, pentaerythritol triacrylate, pentaerythritol tetraacrylate (PETTA), glycerol triacrylate, ECH-modified glycerol triacrylate, EO-modified glycerol triacrylate, PO-modified glycerol triacrylate, tris(acryloxyethyl) isocyanurate, dipentaerythritol hexaacrylate (DPHA), caprolactone-modified dipentaerythritol hexaacrylate, dipentaerythritol hydroxypentaacrylate, alkyl-modified dipentaerythritol pentaacrylate, alkyl-modified dipentaerythritol tetraacrylate, alkyl-modified dipentaelythritol triacrylate, dimethylolpropane tetraacrylate (DTMPTA), pentaerythritol ethoxytetraacrylate, EO-modified phosphoric triacrylate, and 2,2,5,5-tetrahydroxymethylcyclopentanone tetraacrylate. Each of these can be used alone or in combination with others.

The proportion of the polymerizable compound X in the liquid composition X is preferably 5.0% by mass or more and 70.0% by mass or less, more preferably 10.0% by mass or more and 50.0% by mass or less, and even more preferably 20.0% by mass or more and 40.0% by mass or less. When the proportion of the polymerizable compound X is 70.0% by mass or less, the pore size of the resulting porous resin X is not too small, which is several nanometers or less, and the porous resin X is given an appropriate porosity which avoids poor permeation of liquids or gases. When the proportion of the polymerizable compound X is 5.0% by mass or more, a three-dimensional network structure is sufficiently formed in the resin X to sufficiently form the porous structure, and the strength of the resulting porous structure is advantageously improved.

Solvent X

The solvent X (hereinafter also referred to as "porogen") is a liquid compatible with the polymerizable compound X. The solvent X is a liquid that becomes incompatible (i.e., causes phase separation) with the resulting polymer (i.e., resin X) in the process of polymerizing the polymerizable compound X in the liquid composition X. Accordingly, in the present disclosure, the term "solvent X" is distinguished from the commonly-used term "solvent" in its meanings. Because the liquid composition X contains the solvent X, the polymerizable compound X forms the porous resin X when polymerizing in the liquid composition X. It is preferable that the solvent X be capable of dissolving a compound (i.e., polymerization initiator to be described later) that generates radicals or acids by light or heat. One type of solvent X may be used alone, or two or more types of solvents X may be used in combination. In the present disclosure, the solvent X is not polymerizable.

One type of porogen alone or a combination of two or more types of porogens has a boiling point of preferably 50° C. or higher and 250° C. or lower, and more preferably 70° C. or higher and 200° C. or lower, at normal pressures. When the boiling point is 50° C. or higher, vaporization of the porogen is suppressed at around room temperature and handling of the liquid composition X becomes easy, so that the amount of porogen in the liquid composition X can be easily controlled. When the boiling point is 250° C. or lower, the time required for drying the porogen after polymerization is shortened, and the productivity of the porous resin X is improved. In addition, the amount of porogen remaining inside the porous resin X can be reduced, so that the quality of the porous resin X as a functional layer, such as a separation layer for separating substances or a reaction layer as a reaction field, is improved.

Further, one type of porogen alone or a combination of two or more types of porogens preferably has a boiling point of 120° C. or higher at normal pressures.

Specific examples of the porogen include, but are not limited to: ethylene glycols such as diethylene glycol monomethyl ether, ethylene glycol monobutyl ether, ethylene glycol monoisopropyl ether, and dipropylene glycol monomethyl ether; esters such as γ-butyrolactone and propylene carbonate; and amides such as N,N-dimethylacetamide, Specific examples thereof further include liquids having a relatively large molecular weight, such as methyl tetradecanoate, methyl decanoate, methyl myristate, and tetradecane. Specific examples thereof further include liquids such as acetone, 2-ethylhexanol, and 1-bromonaphthalene.

In the present disclosure, the above-described liquids do not always serve as a porogen. In the present disclosure, as described above, the porogen is a liquid that is compatible with the polymerizable compound X and becomes incompatible (i.e., causes phase separation) with the resulting polymer (i.e., resin X) in the process of polymerizing the polymerizable compound X in the liquid composition X. In other words, whether or not a liquid serves as a porogen depends on the relation between the polymerizable compound X and the resulting polymer (i.e., the resin X formed by polymerization of the polymerizable compound X).

The liquid composition X only needs to contain at least one type of porogen having the above-described specific relation with the polymerizable compound X. Therefore, the range of selection of materials for preparing the liquid composition X is widened, and design of the liquid composition X becomes easy. As the range of selection of materials for preparing the liquid composition X is widened, the liquid composition X can provide a wide range of application in response to requirements for any characteristics other than the capability of forming a porous structure. For example, when the liquid composition X is to be discharged by an inkjet method, the liquid composition X is required to have discharge stability as a required characteristic other than the capability of forming a porous structure. In this case, since the range of selection of materials is wide, it is easy to design such a liquid composition X.

In the present disclosure, the liquid composition X only needs to contain at least one type of porogen having the above-described specific relation with the polymerizable compound X. Therefore, the liquid composition X may further additionally contain a liquid (i.e., non-porogen liquid) that does not have the above-described specific relation with the polymerizable compound X. The proportion of the liquid (i.e., non-porogen liquid) that does not have the above-described specific relation with the polymerizable compound X in the liquid composition X is preferably 10.0% by mass or less, more preferably 5.0% by mass or less, and even more preferably 1.0% by mass or less. Particularly preferably, such a liquid is not contained in the liquid composition X.

The proportion of the porogen in the liquid composition X is preferably 300% by mass or more and 95.0% by mass or less, more preferably 50.0% by mass or more and 90.0% by mass or less, and even more preferably 60.0% by mass or more and 80.0% by mass or less. When the proportion of the porogen is 30.0% by mass or more, the pore size of the resulting porous body is not too small, which is several nanometers or less, and the porous body is given an appropriate porosity which avoids poor permeation of liquids or gases. When the proportion of the porogen is 95.0% by mass or less, a three-dimensional network structure is sufficiently formed in the resin X to sufficiently form a porous structure, and the strength of the resulting porous structure is advantageously improved.

The mass ratio between the polymerizable compound X and the porogen (polymerizable compound X:porogen) in the liquid composition X is preferably from 1.0:0.4 to 1.0:19.0, more preferably from 1.0:1.0 to 1.0:9.0, and even more preferably from 1.0:1.5 to 1.0:4.0.

Polymerization Initiator

A polymerization initiator is a material capable of generating active species (e.g., radicals, cations) by energy (e.g., light, heat) to initiate a polymerization of the polymerizable compound X. As such a polymerization initiator, known radical polymerization initiators, cationic polymerization initiators, and base generators can be used singly or in combination of two or more. Among them, photoradical polymerization initiators are preferred.

As the photoradical polymerization initiator, photoradical generators can be used. Specific preferred examples thereof include, but are not limited to, photoradical polymerization initiators such as Michler's ketone and benzophenone known by the trade names IRGACURE and DAROCUR. More specific examples thereof include benzophenone and acetophenone derivatives, such as α-hydroxy- or α-aminoacetophenone, 4-aroyl-1,3-dioxolane, benzyl ketal, 2,2-diethoxyacetophenone, p-dimethylaminoacetophenone, p-dimethylaminopropiophenone, benzophenone, 2-chlorobenzophenone, pp'-dichlorobenzophenone, pp'-bis-diethylaminoberizophenone, Michler's ketone, benzyl, benzoin, benzyl dimethyl ketal, tetramethylthiuram monosulfide, thioxanthone, 2-chlorothioxanthone, 2-methylthioxanthone, azobisisobutyronitrile, benzoin peroxide, di-tert-butyl peroxide, 1-hydroxycyclohexylphenyl ketone, 2-hydroxy-2-methyl-1-phenyl-1-one, 1-(4-isopropylphenyl)-2-hydroxy-2-methylpropane-1-one, methylbenzoyl formate, benzoin isopropyl ether, benzoin methyl ether, benzoin ethyl ether, benzoin ether, benzoin isobutyl ether, benzoin n-butyl ether, benzoin n-propyl, 1-hydroxy-cyclohexyl-phenyl-ketone, 2-benzyl-2-dimethylamino-1-(4-morpholinophenyl)-butanone-1,1-hydroxy-cyclohexyl-phenyl-ketone, 2,2-dimethoxy-1,2-diphenylethane-1-one, bis(η5-2,4-cyclopentadiene-1-yl)-bis(2,6-difluoro-3-(1H-pyrrole-1-yl)-phenyl)titanium, bis(2,4,6-trimethylbenzoyl)-phenylphosphine oxide, 2-methyl-1-[4-(methylthio)phenyl]-2-morpholinopropane-1-one, 2-hydroxy-2-methyl-1-phenyl-propane-1-one (DAROCUR 1173), bis(2,6-dimethoxybenzoyl)-2,4,4-trimethyl-pentylphosphine oxide, 1-[4-(2-hydroxyethoxy)-phenyl]-2-hydroxy-2-methyl-1-propane-1-one monoacylphosphine oxide, bisacylphosphine oxide, titanocene, fluorescein, anthraquinone, thioxanthone, or xanthone, lophine dimer, trihalomethyl compounds or dihalomethyl compounds, active ester compounds, and organoboron compounds.

Furthermore, photo-cross-linkable radical generators such as bisazide compounds may be used in combination. In the case of polymerization only by heat, thermal polymerization initiators such as azobisisobutyronitrile (AIBN), which is a typical radical generator, can be used.

For a sufficient curing rate, the proportion of the polymerization initiator to 100.0% by mass of the polymerizable compound X is preferably 0.05% by mass or more and 10.0% by mass or less, more preferably 0.5% by mass or more and 5.0% by mass or less.

Surfactant

The surfactant is used to adjust the surface tension of the liquid composition X as necessary. When the surfactant is used to adjust the surface tension of the liquid composition X for the purpose of improving the surface uniformity of the porous resin, the surfactant is also referred to as a leveling agent. The surfactant is preferably contained in the liquid composition X, but may not be contained therein.

Examples of the surfactant include, but are not particularly limited to, silicon-based surfactants, acetylene glycol-based surfactants, and fluorine-based surfactants. Among these, fluorine-based surfactants are preferred.

Specific examples of the silicon-based surfactants include, but are not limited to: BYK-300, BYK-306, BYK-310, BYK-320, BYK-330, BYK-344, BYK-346, BYK—UV3500, and BYK-UV3570 (products of BYK Japan KK), and KP-341, KP-358, KP-368, KF-96-50CS, and KF-50-100CS (products of Shin-Etsu Chemical Co., Ltd.).

Specific examples of the acetylene-glycol-based surfactants include, but are not limited to, DYNOL 604, SURFYNOL 104H, SURFYNOL 104A, SURFYNOL 104BC, SURFYNOL 104DPM, SURFYNOL 104PA, SURFYNOL 104S, SURFYNOL 420, SURFYNOL 440, SURFYNOL SE, SURFYNOL SE-F, and SURFYNOL 61 (products of Air Products Japan K.K.).

Specific examples of the fluorine-based surfactants include, but are not limited to: MEGAFACE F-430, MEGAFACE F-444, MEGAFACE F-472SF, MEGAFACE F-475, MEGAFACE F-477, MEGAFACE F-552, MEGAFACE F-553, MEGAFACE F-554, MEGAFACE F-555, MEGAFACE F-556, MEGAFACE F-558, MEGAFACE R-94, MEGAFACE RS-75, and MEGAFACE RS-72-K (products of DIC Corporation); EFTOP EF-351, EFTOP EF-352, EFTOP EF-601, EFTOP EF-801, and EFTOP EF-802 (products of Mitsubishi Materials Corporation); FTERGENT 222F, FTERGENT 251, and FTX-218 (products of NEOS COMPANY LIMITED), and SURFLON SC-101 and SURFLON (products of AGC Seimi Chemical Co., Ltd.).

The proportion of the surfactant in the liquid composition X is preferably 0.01% by mass or more and 5.0% by mass or less, more preferably 0.03% by mass or more and 3.0% by mass or less, and even more preferably 0.05% by mass or more and 1.0% by mass or less. When the proportion of the surfactant is 0.01% by mass or more, it is easy to adjust the surface tension of the liquid composition X. When the proportion of the surfactant is 5.0% by mass or less, it is easy to control the behavior of the liquid composition X after being applied.

Conditions for Producing Porous Resin X

The porous resin X, which is a porous body of the resin X, is formed by polymerization-induced phase separation occurring in the liquid composition X. The polymerization-induced phase separation refers to a state in which the porogen is compatible with the polymerizable compound X but becomes incompatible (i.e., phase-separated) with the polymer (i.e., resin X) produced in the process of polymerizing the polymerizable compound X. Among existing methods for obtaining a porous body by phase separation, the polymerization-induced phase separation method advantageously produces a porous body having a network structure that has high resistance to chemicals and heat. Further advantageously, as compared with other methods, the process time is shorter and the surface modification is easier.

Next, a process for forming the porous resin X by polymerization-induced phase separation is described. The polymerizable compound X undergoes a polymerization reaction upon irradiation with light or the like to form the resin X. During this process, the solubility of the porogen in the growing resin X decreases to cause phase separation between the resin X and the porogen. Finally, the resin X forms a network porous structure in which the pores are filled with the porogen. The porogen is removed by drying, and the porous resin X is isolated. Thus, to form the porous resin X, a condition indicating the compatibility of the polymerizable compound X with the porogen and another condition indicating the compatibility of the resin X with the porogen are considered.

Condition Indicating Compatibility of Polymerizable Compound X with Porogen

A condition indicating that the polymerizable compound X is compatible with the porogen may be, for example, a condition in which the liquid composition X indicates a light transmittance of 30% or more at a wavelength of 550 nm, when the light transmission is measured while the liquid composition X is being stirred. A measurement procedure for determining whether or not this condition is satisfied is as follows.

First, the liquid composition X is injected into a quartz cell, and the transmittance of light (i.e., visible light) at a wavelength of 550 nm of the liquid composition X is measured while stirring the liquid composition X using a stirrer at 300 rpm. When the light transmittance is 30% or more, it is determined that the polymerizable compound X and the porogen are in a compatible state, and when the light transmittance is less than 30%, it is determined that the polymerizable compound X and the porogen are in an incompatible state. Various conditions for measuring the light transmittance are as described below.

Quartz cell: Special microcell with screw cap (trade name: M25-LIV-2)

Transmittance measuring instrument: USB 4000, product of Ocean Optics, Inc.

Stirring speed: 300 rpm

Measurement wavelength: 550 nm

Reference: Light transmittance at a wavelength of 550 nm measured and acquired with the quartz cell filled with the air (i.e., transmittance of 100%)

Condition Indicating Compatibility of Resin X with Porogen

A condition indicating that the resin X is incompatible (i.e., phase-separated) with the porogen may be, for example, a condition in which a haze measuring element produced from the liquid composition X indicates a haze increasing rate of 1.0%. A measurement procedure for determining whether or not this condition is satisfied is as follows.

First, fine resin particles are uniformly dispersed on a non-alkali glass substrate by spin coating to form a gap agent. Subsequently, the substrate to which the gap agent has been applied and another non-alkali glass substrate to which no gap agent has been applied are brought to bond to each other in a manner that the two substrates come to sandwich the surface coated with the gap agent. After that, the liquid composition X is made to till the space between the bonded substrates by utilizing a capillary action, thus producing a "pre-UV irradiation haze measuring element". Subsequently, the pre-UV irradiation haze measuring element is irradiated with UV to cure the liquid composition X. Finally, the peripheries of the substrates are sealed with a sealing agent, thus producing a "haze measuring element". Various production conditions are described below.

Non-alkali glass substrate: OA-10G, product of Nippon Electric Glass Co., Ltd., 40 mm, t=0.7 mm Gap agent: Fine resin particles MICROPEARL GS-L100, having an average particle diameter of 100 μm Spin coating conditions: The amount of dispersion droplets is 150 μL, rotation speed is 1000 rpm, and rotation time is 30 s.

Amount of liquid composition X filled: 160 μL

UV irradiation conditions: The light source is UV-LED, the light source wavelength is 365 nm, the irradiation intensity is 30 mW/cm$^2$, and the irradiation time is 20 s.

Sealing agent: TB3035B (product of ThreeBond Group)

Next, the haze values of the above-produced pre-UV irradiation haze measuring element and haze measuring element are measured. The measured haze value of the pre-UV irradiation haze measuring element is set as a reference (i.e., the haze value is 0). The increasing rate ("haze increasing rate") of the measured haze value of the haze measuring element with respect to the measured haze value of the pre-UV irradiation haze measuring element is calculated. The haze value of the haze measuring element increases as the compatibility of the resin X formed by polymerization of the polymerizable compound X with the porogen decreases. By contrast, the haze value decreases as the compatibility increases. A higher haze value indicates that the resin X formed by polymerization of the polymerizable compound X is more likely to form a porous structure. When the haze increasing rate is 1.0% or more, it is determined that the resin X and the porogen are in an incompatible state, and when the haze increasing rate is less than 1.0%, it is determined that the resin X and the porogen are in a compatible state. An instrument used for the measurement is as follows.

Haze meter NDH5000, product of NIPPON DENSHOKU INDUSTRIES CO., LTD.

Method for Manufacturing Liquid Composition X

Preferably, the liquid composition X is prepared through a step of dissolving a polymerization initiator in the polymerizable compound X, a step of further dissolving a porogen and other components therein, and a step of stirring them to obtain a uniform solution.

Physical Properties of Liquid Composition X

In view of workability at applying the liquid composition X, the liquid composition X preferably has a viscosity at 25° C. of 1.0 mPa·s or more and 150.0 mPa·s or less, more preferably 1.0 mPa·s or more and 30.0 mPa·s, even more preferably 1.0 mPa·s or more and 25.0 mPa·s or less. When the viscosity of the liquid composition X is 1.0 mPa·s or more and 30.0 mPa·s or less, the liquid composition X exhibits good dischargeability even when used tier an inkjet method. The viscosity can be measured using a viscometer (RE-550L, product of Toki Sangyo Co., Ltd.).

Liquid Composition Y

The liquid composition Y is a liquid used in combination with the liquid composition X that forms a porous resin. The liquid composition Y is preferably used for suppressing diffusion of the liquid composition X and forming a porous resin at a desired position. Specifically, in the case of forming a porous resin on a porous substrate, it is preferable to apply the liquid composition Y to the porous substrate before applying the liquid composition X thereto for suppressing the liquid composition X from permeating the porous substrate. When the liquid composition X is suppressed from permeating the porous substrate, partial formation of the porous resin in the porous substrate is suppressed, and deterioration of the function of the porous substrate is thereby suppressed. More specifically, in the case of using the liquid composition set for forming a separator of a power storage element, partial formation of the porous resin forming the separator in an active material having a porous structure is suppressed, deterioration of the function of the active material is thereby suppressed, and as a result, deterioration of the function of the power storage element is suppressed.

The liquid composition Y contains a solvent Y and optionally other components. Preferably, the liquid composition Y does not form a porous resin when used alone (in other words, when not used in combination with the liquid composition X). That is, preferably, the liquid composition Y is substantially free of polymerizable compound. Here, "substantially free of polymerizable compound" means that any polymerizable compound is not detected by a method known and common in the art for confirming the presence or absence of polymerizable compound in the liquid composition Y.

Solvent Y

The solvent Y is so selected that the surface tension of the liquid composition X becomes smaller than the surface tension of the liquid composition Y, as described later. One type of solvent Y may be used alone, or two or more types of solvents Y may be used in combination. In the present disclosure, unlike the solvent X, the solvent Y is not referred to as a porogen.

One type of the solvent Y alone or a combination of two or more types of the solvents Y has a boiling point of preferably 50° C. or higher and 250° C. or lower, and more preferably 70° C. or higher and 200° C. or lower, at normal pressures. When the boiling point is 50° C. or higher, vaporization of the solvent V is suppressed at around room temperature and handling of the liquid composition Y becomes easy, so that the amount of the solvent Y in the liquid composition Y can be easily controlled. When the boiling point is 250° C. or lower, the time required for drying the solvent Y after formation of the porous resin is shortened, and the productivity is improved. In addition, the amount of the solvent Y remaining inside the porous resin can be reduced, so that the quality of the porous resin as a functional layer, such as a separation layer for separating substances or a reaction layer as a reaction field, is improved.

Further, one type of the solvent Y alone or a combination of two or more types of the solvents Y preferably has a boiling point of 120° C. or higher at normal pressures. Examples of the solvent Y include, but are not limited to, ethylene glycols such as ethylene glycol monobutyl ether, ketones such as cyclohexanone, esters such as diethyl carbonate, and amides such as N,N-dimethylacetamide. Examples of the solvent Y further include, but are not limited to, liquids such as ethanol, 1,3-butanediol, and 2-propanol.

The proportion of the solvent Y in the liquid composition Y is preferably 60.0% by mass or more, more preferably 70.0% by mass or more, even more preferably 80.0% by mass or more, and particularly preferably 90.0% by mass or more. The solvent Y may account for the total amount (100% by mass) of the liquid composition Y.

Physical Properties of Liquid Composition Y

In view of workability at applying the liquid composition Y, the liquid composition Y preferably has a viscosity at 2.5° C. of 1.0 mPa·s or more and 150.0 mPa·s or less, more preferably 1.0 mPa·s or more and 30.0 mPa·s, even more preferably 1.0 mPa·s or more and 25.0 mPa·s or less. When the viscosity of the liquid composition Y is 1.0 mPa·s or more and 30.0 mPa·s or less, the liquid composition Y exhibits good dischargeability even when used for an inkjet method. The viscosity can be measured using a viscometer (RE-550L, product of Toki Sangyo Co., Ltd.).

Relation in Surface Tension between Liquid Composition X and Liquid Composition Y In the liquid composition set, the surface tension of the liquid composition X is smaller than the surface tension of the liquid composition Y. The surface tension of the liquid composition X is preferably smaller than the surface tension of the liquid composition Y by 0.3 mN/m or more, and more preferably by 0.9 mN/m or more.

A method for adjusting the surface tension of the liquid composition X to be smaller than the surface tension of the liquid composition Y is not particularly limited. Examples thereof include, but are not limited to, allowing the liquid composition X to contain a surfactant.

A reason why the surface tension of the liquid composition X is made smaller than the surface tension of the liquid composition Y is described below.

There is a concern that the surface uniformity of the resultant porous resin may be lowered if the liquid composition X comes into contact with the liquid composition Y. More specifically, the concern increases in a case where the liquid composition X is applied to a porous substrate to form a porous resin on the porous substrate. In such a case, for the purpose of suppressing permeation of the liquid composition X into the porous substrate in forming a porous resin on the porous substrate, the liquid composition Y is applied to the porous substrate in advance. However, if the surface tensions of the liquid composition X and the liquid composition Y are not appropriately adjusted, the surface uniformity of the resultant porous resin may be lowered when the liquid composition X comes into contact with the liquid composition Y. Specific cases in which the surface uniformity of the porous resin is low include a case in which small holes (pinholes) are generated in a partial region of the porous resin and the underlying porous substrate is thereby exposed. The liquid composition set of the present disclosure contains the liquid composition X and the liquid composition Y that are adjusted to have appropriate surface tensions, and the surface uniformity of the resulting porous resin is therefore improved.

Relation in Specific Gravity between Liquid Composition X and Liquid Composition Y In the liquid composition set, preferably, the specific gravity of the liquid composition X is smaller than the specific gravity of the liquid composition Y. The specific gravity of the liquid composition X is preferably smaller than the specific gravity of the liquid composition Y by 0.01 or more, more preferably by 0.03 or more. The specific gravity can be measured using a dynamic surface tensiometer (Portable Dynamic Surface Tensiometer DynoTester, product of SITA).

A reason why the specific gravity of the liquid composition X is made smaller than the specific gravity of the liquid composition Y is described below.

When the liquid composition X and the liquid composition Y come into contact with each other, there is a concern that a part of the liquid composition X moves to the liquid composition Y side and thus the shape of the resulting porous resin becomes different from the expected shape. More specifically, the concern increases in a case where the liquid composition X is applied to a porous substrate to form a porous resin on the porous substrate. In such a case, for the purpose of suppressing permeation of the liquid composition X into the porous substrate in forming a porous resin on the porous substrate, the liquid composition Y is applied to the porous substrate in advance. However, when the specific gravity of the liquid composition X applied over the liquid composition Y is larger than the specific gravity of the liquid composition Y, a part of the liquid composition X moves so as to immerse in the liquid composition Y side, and the layer thickness of the porous resin formed over the porous substrate may become small. The liquid composition set of the present disclosure contains the liquid composition X and the liquid composition Y that are adjusted to have appropriate specific gravities, and the shape of the resulting porous resin is therefore formed as expected.

Porous Resin Manufacturing Apparatus and Porous Resin Manufacturing Method

FIG. 1 is a schematic diagram illustrating a porous resin manufacturing apparatus that performs a porous resin manufacturing method of the present disclosure.

Porous Resin Manufacturing Apparatus

A porous resin manufacturing apparatus 100 manufactures a porous resin using the liquid composition X and the liquid composition Y described above. The porous resin manufacturing apparatus 100 includes a printing process unit 10, a polymerization process unit 20, and a heating process unit 30. The printing process unit 10 performs a process of applying the liquid composition X and the liquid composition Y to a printing substrate 4 to form respective layers of the liquid composition X and the liquid composition Y. The polymerization process unit 20 performs a polymerization process of activating a polymerization initiator in the liquid composition X layer to cause polymerization of a polymerizable compound to obtain a porous resin precursor 6. The heating unit 30 performs a heating process of heating the porous resin precursor 6 to obtain a porous resin. The porous resin manufacturing apparatus 100 further includes a conveyance unit 5 that conveys the printing substrate 4. The conveyance unit 5 conveys the printing substrate 4 through the printing process unit 10, the polymerization process unit 20, and the heating process unit 30, in that order, at a preset speed.

Printing Process Unit

The printing process unit 10 includes s printing device 1a, an accommodating container 1b, and a supply tube 1c. The printing device 1a serves as an application device that performs an application process of applying the liquid composition X and the liquid composition Y to the printing substrate 4. The accommodating container 1b separately accommodates the liquid composition X and the liquid composition Y. The supply tube 1c supplies the liquid composition X and the liquid composition Y accommodated in the accommodating container 1b to the printing device 1a. The application device includes an application device X that applies the liquid composition X and an application device Y that applies the liquid composition Y. The application process includes an application process X of applying the liquid composition X and an application process Y of applying the liquid composition Y.

The accommodating container 1b separately accommodates the liquid composition X and the liquid composition Y. (In FIG. 1, the liquid composition X and the liquid composition Y are simply denoted as a liquid composition 7.) In the printing process unit 10, the printing device 1a separately discharges the liquid composition X and the liquid composition Y to separately apply the liquid composition X and the liquid composition Y onto the printing substrate 4 to firm respective thin-film layers of the liquid composition X and the liquid composition Y. In the present disclosure, the application process Y is performed first, and the application process X is performed thereafter. After the application process Y, the application process X is preferably performed in a manner that the liquid composition X is applied to a region which overlaps with at least a part of the region to which the liquid composition Y has been applied.

The accommodating container 1b may be either integrated with the porous resin manufacturing apparatus 100 or detachable from the porous resin manufacturing apparatus 100. Further, the accommodating container 1b may be used for supplying the liquid compositions to another accommodating container integrated with the porous resin manufacturing apparatus 100 or that detachable from the porous resin manufacturing apparatus 100.

The printing device 1a is not particularly limited as long as it is capable of applying the liquid composition X and the liquid composition Y. Specific examples thereof include, but are not limited to, printing devices employing spin coating, casting, micro gravure coating, gravure coating, bar coating, roll coating, wire bar coaling, dip coating, slit coating, capillary coating, spray coating, nozzle coating, or a printing method such as gravure printing, screen printing, flexographic printing, offset printing, reverse printing, and inkjet printing.

The accommodating container 1b and the supply tube 1c can be arbitrarily selected as long as they can reliably and separately accommodate and supply the liquid composition X and the liquid composition Y. The accommodating container 1b and the supply tube 1c are preferably made of a material having light-shielding property in relatively short wavelength regions such as ultraviolet regions and visible light regions. In this case, the liquid composition X is prevented from starting a polymerization by external light.

Polymerization Process Unit

As illustrated in FIG. 1, the polymerization process unit 20 includes a light emitter 2a and a polymerization-inactive gas circulator 2b. The light emitter 2a is a curing device that performs a curing process of curing the liquid composition by emitting active energy rays such as heat and light thereto. The polymerization-inactive gas circulator 2b circulates a polymerization-inactive gas. The light emitter 2a emits light to the liquid composition X layer and the liquid composition layer formed by the printing process unit 10 in the presence of a polymerization-inactive gas, to initiate a photopolymerization in the liquid composition X layer, thereby obtaining the porous resin precursor 6.

The light emitter 2a is not particularly limited as long as it is appropriately selected according to the absorption wavelength of the photopolymerization initiator and is capable of initiating and proceeding polymerization of the polymerizable compound contained in the liquid composition X layer. Specific examples thereof include, but are not limited to, ultraviolet light sources such as high-pressure mercury lamp, metal halide lamp, hot cathode tube, cold cathode tube, and LED (light emitting diode). However, since light having a shorter wavelength generally tends to reach a deeper portion, it is preferable that the light source be selected according to the thickness of the porous film to be formed.

When the emission intensity of the light source of the light emitter 2a is too strong, a polymerization rapidly proceeds before the occurrence of sufficient phase separation, so that it becomes more difficult to obtain a porous structure. By contrast, when the emission intensity is too weak, a phase separation proceeds beyond the microscale, resulting in variation and coarsening of the pores. In addition, the emission time becomes longer, and the productivity tends to decrease, Therefore, the emission intensity is preferably 10 $mW/cm^2$ or more and 1 $W/cm^2$ or less, and more preferably 30 $mW/cm^2$ or more and 300 $mW/cm^2$ or less.

The polymerization-inactive gas circulator 2b has a role of lowering the concentration of oxygen, which is polymerization-active, in the atmosphere to proceed a polymerization reaction of the polymerizable compound X present near the surface of the liquid composition X layer without any inhibition. The polymerization-inactive gas is not particularly limited as long as it exerts the above-described functions. Specific examples thereof include, but are not limited to, nitrogen gas, carbon dioxide gas, and argon gas.

The flow rate is determined for an efficient inhibition reduction effect. It is preferable that the $O_2$ concentration is less than 20% (i.e., an environment where the oxygen concentration is lower than that of the atmosphere), more preferably 0% or more and 15% or less, and even more preferably 0% or more and 5% or less. It is preferable that the polymerization-inactive gas circulator 2b be equipped with a temperature controller capable of controlling the temperature, for providing reliable polymerization proceeding conditions.

Heating Process Unit

As illustrated in FIG. 1, the heating process unit 30 includes a heater 3a. The heating process unit 30 performs a solvent removing process in which the heater 3a heats the solvent X and the solvent Y remaining in the porous resin precursor 6 formed by the polymerization process unit 20 to dry and remove them. As a result, a porous resin is formed.

The heating process unit 30 may perform the solvent removing process under reduced pressures.

The heating process unit 30 also performs a polymerization promoting process and an initiator removing process. In the polymerization promoting process, the heater 3a heats the porous resin precursor 6 to further promotes the polymerization reaction performed by the polymerization process unit 20. In the initiator removing process, the heater 3a heats the photopolymerization initiator remaining in the porous resin precursor 6 to dry and remove it. The polymerization promoting process and the initiator removing process is not necessarily performed at the time of the solvent removing process and may be performed before or after the solvent removing process.

The heating process unit 30 also performs, after the solvent removing process, a polymerization completing process in which the porous resin is heated under reduced pressure. The heater 3a is not particularly limited as long as it exerts the above-described functions. Examples thereof include, but are not limited to, an IR (infrared) heater and a hot air heater.

The heating temperature and time can be appropriately selected according to the boiling points of the solvent X and the solvent Y contained in the porous resin precursor 6 or the thickness of the formed film.

Printing Substrate

The printing substrate 4 may be made of any material regardless of whether it is transparent or opaque. Specific examples thereof include, but are not limited to: transparent substrates such as glass substrates, resin film substrates (e.g., various plastic films), and composite substrates thereof: and opaque substrates such as silicon substrates, metal substrates (e.g., stainless steel), and laminates thereof.

The printing substrate 4 may also be a recording medium made of, for example, plain paper, glossy paper, special paper, or cloth. The recording medium may also be a low-permeability substrate (low-absorptivity substrate). The low-permeability substrate refers to a substrate having a surface with a low level of moisture permeability, absorptivity, or adsorptivity. Examples thereof also include a material having a number of hollow spaces inside but not opened to the exterior. Examples of the low-permeability substrate include, but are not limited to, coated papers used in commercial printing, and recording media such as surface-coated paperboard having intermediate and back layers in each of which waste paper pulp is blended.

As described above, preferably, the printing substrate 4 is a porous substrate. This is because in the use of a porous substrate makes the effect of the present invention more remarkable. Specific examples of the porous substrate include, but are not limited to, active material layers used in power storage elements, and porous sheets used as insulating layers in power storage elements or power generation elements.

With regard to the shape, the substrate may be in any form such as that having a curved surface or a recessed-projected shape, as long as the substrate is applicable to the printing process unit 10 and the polymerization process unit 20.

Porous Resin

The film thickness of the porous resin formed by the liquid composition set is not particularly limited. In view of curing uniformity during polymerization, the film thickness is preferably 0.01 μm or more and 500 μm or less, more preferably 0.01 μm or more and 100 μm or less, even more preferably 1 μm or more and 50 μm or less, and particularly preferably 10 μm or more and 20 μm or less. When the film thickness is 0.01 μm or more, the surface area of the resulting porous resin is large, and the function of the porous resin can be sufficiently exerted. When the film thickness is 500 μm or less, light or heat used for the polymerization is suppressed from becoming non-uniform in the film thickness direction, and the resulting porous resin is uniform in the film thickness direction, Such a porous resin that is uniform in the film thickness direction has less structural unevenness, and a decrease in liquid or gas permeability is suppressed. The film thickness of the porous resin is appropriately adjusted according to the application of the porous resin. For example, when the porous resin is used as an insulating layer of a power storage element, the thickness is preferably 10 μm or more and 20 μm or less.

The porous resin to be formed is not particularly limited. For securing good liquid or gas permeability, the porous resin preferably has a three-dimensional branched network structure of the cured resin as the backbone and a bicontinuous structure (also referred to as monolith structure) in Which multiple pores are continuously connected with each other. In other words, preferably, the porous resin has multiple pores and each one of the pores is communicated with surrounding pores and spread three-dimensionally. As the pores are communicated with each other, sufficient permeation of liquids or gases occurs, and the function of substance separation or reaction field are effectively exerted.

One physical property obtained when having a bicontinuous structure is air permeability. The air permeability of the porous resin can be measured according to Japanese Industrial Standards (JIS) P8117. The air permeability is preferably 500 seconds/100 mL or less, and more preferably 300 seconds/100 mL or less. In this case, the air permeability can be measured using a Gurley densometer (product of Toyo Seiki Seisaku-sho Ltd.).

The cross-sectional shape of the pores of the porous resin is not particularly limited and may be in various shapes, such as a substantially circular shape, a substantially elliptical shape, or a substantially polygonal shape, and in various sizes. Here, the size of the pore refers to the length of the longest portion in the cross-sectional shape of the pore. The size of the pore can be determined from a cross-sectional image taken with a scanning electron microscope (SEM). The size of the pores of the porous resin is not particularly limited. In view of liquid or gas permeability, the size of the pores is preferably 0.01 μm or more and 10 μm or less. The porosity of the porous resin is preferably 30% or more, and more preferably 50% or more. A method for adjusting the size of the pores and the porosity of the porous resin to the above-described ranges is not particularly limited. Examples thereof include, but are not limited to, a method of adjusting the content of the polymerizable compound X in the liquid composition X, a method of adjusting the content of the porogen in the liquid composition X, and a method of adjusting the irradiation condition of active energy rays.

Applications of Porous Resin
Application for Power Storage Element or Power Generation Element The porous resin formed using the liquid composition set of the present disclosure can be used as an insulating layer for power storage elements or power generation elements. In other words, the liquid composition set of the present disclosure can be used for producing an insulating layer in power storage elements or power generation elements. When used in these applications, the insulating layer (i.e., separator) is preferably formed by applying the liquid composition Y and the liquid composition X onto an active material layer that has been formed on an electrode substrate in advance.

As an example of the insulating layer for power storage elements or power generation elements, a film-like porous insulating layer having pores of a predetermined size or a predetermined porosity is known. On the other hand, the liquid composition set of the present disclosure can improve the degree of freedom in designing power storage elements and power generation elements in terms of their performances, by appropriately changing the content of the polymerizable compound X, the content of the porogen, the irradiation condition of active energy rays, etc., to adjust the pore size and the porosity. In addition, the liquid composition se of the present disclosure can be applied by various methods, such as inkjet methods, and can improve the degree of freedom in designing power storage elements and power generation elements in terms of their shapes. The liquid composition set of the present disclosure is used such that the liquid composition X is applied to the region of the active material layer to which the liquid composition Y has been applied. Therefore, the liquid composition X is cured to form a porous resin without excessively entering the active material layer. As a result, a decrease in the function of the active material layer is suppressed.

Here, the insulating layer is a member that separates a positive electrode and a negative electrode from each other and secures ionic conductivity between the positive electrode and the negative electrode. In the present disclosure, the insulating layer is not limited to that having a layer shape.

The liquid composition set of the present disclosure can additionally form an insulating layer (i.e., second insulating layer) formed of a porous resin layer when being applied onto another insulating layer (i.e., first insulating layer) for power storage elements or power generation elements. When the second insulating layer is formed over the first insulating layer, various functions of the entire insulating layers, such as heat resistance, impact resistance, and high-temperature shrinkage resistance, can be added or improved.

The electrode substrate is not particularly limited as long as it is a substrate having conductivity. Examples thereof include, but are not limited to, aluminum foil, copper foil, stainless steel foil, and titanium foil, each of which is generally used for secondary batteries and capacitors serving as power storage elements, particularly suitable for lithium ion secondary batteries. Examples thereof further include an etched foil with fine holes formed by etching the above foils, and a perforated electrode substrate used for lithium ion capacitors. Further, carbon paper used for power generation elements (e.g., fuel cells), a fibrous electrode which is in a non-woven or woven planar form, and the above-described perforated electrode substrate which has fine holes may also be used. Moreover, for solar devices, a flat substrate made of glass or plastic may also be used on which a transparent semiconductor film of indium-titanium oxide or zinc oxide is formed or a thin conductive electrode film is deposited, in addition to the above-described electrode.

The active material layer is formed by dispersing a powder active material or catalyst composition in a liquid, applying the liquid onto the electrode substrate, and fixing and drying the liquid. Generally, the active material layer is formed by means of printing using a spray, dispenser, or die coater, or pull-up coating, followed by drying.

The positive electrode active material is not particularly limited as long as it is a material capable of reversibly occluding and releasing alkali metal ions. Typically, alkali-metal-containing transition metal compounds may be used as the positive electrode active material. Examples of lithium-containing transition metal compounds include, but are not limited to, composite oxides comprising lithium and at least one element selected from the group consisting of cobalt, manganese, nickel, chromium, iron, and vanadium. Specific examples of such composite oxides include, but are not limited to, lithium-containing transition metal oxides such as lithium cobalt oxide, lithium nickel oxide, and lithium manganese oxide; olivine-type lithium salts such as $LiFePO_4$; chalcogen compounds such as titanium disulfide and molybdenum disulfide; and manganese dioxide. The lithium-containing transition metal oxides refer to metal oxides containing lithium and a transition metal or those in which a part of the transition metal is substituted with a different element. Examples of the different element include, but are not limited to, Na, Mg, Sc, Y, Mn, Fe, Co, Ni, Cu, Zn, Al, Cr, Pb, Sb, and B. Among these, Mn, Al, Co, Ni, and Mg are preferred. One type of different element or two or more types of different elements may be contained in the compound. Each of the above-described positive electrode active materials can be used alone or in combination with others. Examples of the active material for nickel metal hydride batteries include, but are not limited to, nickel hydroxide.

The negative electrode active material is not particularly limited as long as it is a material capable of reversibly occluding and releasing alkali metal ions. Typically, carbon materials including graphite having a graphite-type crystal structure may be used as the negative electrode active material. Examples of such carbon materials include, but are not limited to, natural graphite, spherical or fibrous synthetic graphite, poorly-graphitizable carbon (hard carbon), and easily-graphitizable carbon (soft carbon). Other than the carbon materials, lithium titanate may also be used. For improving energy density of lithium ion batteries, high capacity materials such as silicon, tin, silicon alloy, tin alloy, silicon oxide, silicon nitride, and tin oxide can also be suitably used as the negative electrode active material.

Examples of the active material in nickel metal hydride batteries include, but are not limited to, AB2-type and A2B-type hydrogen storage alloys.

Specific examples of the binder of die negative electrode and positive electrode include, but are not limited to, PVDE (polyvinylidene fluoride), PTFE (polytetrafluoroethylene), polyethylene, polypropylene, aramid resin, polyimide, polyimide, polyamideimide, polyacrylonitrile, polyacrylic acid, polyactylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyether sulfone, hexafluoropolypropylene, styrene butadiene rubber, and carboxymethyl cellulose. Specific examples of the binder further include copolymers of two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene in addition, mixtures of two or more materials selected from these materials may also be used. Examples of conducting agents contained in the electrode include, but are not limited to: graphites such as natural graphite and synthetic graphite; carbon blacks such as acetylene black, Ketjen black, channel black, furnace black, lamp black, and thermal black; conductive fibers such as carbon fibers and metal fibers; carbon fluoride; powders of metals such as aluminum; conductive whiskers such as zinc oxide and potassium titanate; conductive metal oxides such as titanium oxide; and organic conductive materials such as phenylene derivatives and graphene derivatives.

Generally, in fuel cells, the active material serves as a catalyst for the cathode electrode or the anode electrode. The catalyst comprises catalyst particles (e.g., fine particles of a metal such as platinum, ruthenium, and platinum alloy) supported on a catalyst carrier (e.g., carbon). The catalyst particles can be made supported on the surface of the catalyst carrier by suspending the catalyst carrier in water, then adding precursors of the catalyst particles thereto to make them dissolved in the suspension, and further adding an alkali to produce a hydroxide of the metal. Here, specific examples of the precursors of the catalyst particles include, but are not limited to, chloroplatinic acid, dinitrodiamino platinum, platinum(IV) chloride, platinum(II) chloride, bisacetylacetonatoplatinum, dichlorodiammine platinum, dichlorotetramine platinum, platinum sulfate chlororuthenate, hexachloroiridate, hexachlororhodate, ferric chloride, cobalt chloride, chromium chloride, gold chloride, silver nitrate, rhodium nitrate, palladium chloride, nickel nitrate, iron sulfate, and copper chloride. The catalyst carrier is then applied onto the electrode substrate and reduced under a hydrogen atmosphere or the like, thus preparing an electrode having a surface coated with the catalyst particles active material).

In solar cells, the active material may be tungsten oxide powder, titanium oxide powder, or a semiconductor layer of an oxide (e.g., $SnO_2$, $ZnO$, $ZrO_2$, $Nb_2O_5$, $CeO_2$, $SiO_2$, and $Al_2O_3$) carrying a dye (e.g., ruthenium-tris transition metal complex, ruthenium-bis transition metal complex, osmium-tris transition metal complex, osmium-bis transition metal complex, ruthenium-cis-diaqua-bipyridyl complex, phthalocyanine and porphyrin, and organic-inorganic perovskite crystal).

Solvent X, Solvent Y, and Electrolyte for Use in Power Storage Element

When the porous resin formed by the liquid composition set is used as an insulating layer for a power storage element, preferably, the solvent X and the solvent Y are also used as components of an electrolytic solution constituting the power storage element. In other words, preferably, the electrolytic solution contains the solvent X, the solvent Y and an electrolyte to be described later. When the solvent X and the solvent Y are so selected that they are suitable not only for formation of the porous resin but also for components of the electrolytic solution, some processes can be omitted such as a process (e.g., heating process) of removing the solvent X and the solvent Y after formation of the porous resin and another process of separately impregnating the porous resin with the electrolytic solution.

In a case in which the heating process is omitted, damage to the porous resin and damage to components other than the porous resin (e.g., electrode substrate, active material layer), which may be caused by heating, can be suppressed. As damage to the porous resin is suppressed, a short circuit in the power storage element and reaction unevenness at the time of driving the power storage element are suppressed, and the performance of the power storage element is further improved.

Even when the heating process is performed as the process of removing the solvent X and the solvent Y, the solvent X and the solvent Y may partially remain in the porous body. Such residual solvent X and solvent Y may generate gas due to an unexpected side reaction inside the power storage element and degrade the performance of the power storage element. When the solvent X and solvent Y are usable as components of the electrolyte solution (e.g., components that hardly degrade the performance of the power storage element due to a side reaction), degradation of the performance can be suppressed.

In a case in which the porous resin is used as an insulating layer for a power storage element, preferably, the solvent X and the solvent Y are independently selected from solvents which suppress the occurrence of decomposition reaction or generation of gas at the time of using (i.e., charging and discharging) the power storage element. Specific examples of such solvents include, but are not limited to, propylene carbonate, ethyl methyl carbonate, dimethyl carbonate, ethylene carbonate, acetonitrile, γ-butyrolactone, sulfolane, dioxolane, tetrahydrofuran, 2-methyltetrahydrofuran, dimethylsulfoxide, 1,2-dimethoxyethane, ethoxymethoxyethane, polyethylene glycol, alcohols, and mixtures thereof. Among these, it is preferable to use at least one selected from propylene carbonate, ethyl methyl carbonate, dimethyl carbonate, and ethylene carbonate.

Preferably, the solvent X and the solvent Y which do not require the process (e.g., heating process) of removing them after formation of the porous resin have higher boiling points than those of the solvent X and the solvent Y which require that process. When the boiling points are high, vaporization of the solvent X and the solvent Y is suppressed during the production process, and the composition of the electrolytic solution is suppressed from changing from an initially assumed composition. Specifically, the boiling point is preferably 80° C. or higher, more preferably 85° C. or higher, and still more preferably 90° C. or higher. Note that the boiling point of propylene carbonate is 240° C., the boiling point of ethyl methyl carbonate is 107° C., the boiling point of dimethyl carbonate is 90° C., and the boiling point of ethylene carbonate is 244° C.

In a case in which the solvent X and the solvent Y are those which also function as components of the electrolytic solution constituting the power storage element, it is preferable that the porous resin manufacturing apparatus 100 in FIG. 1 is free of the heating process unit 30.

As described above, the electrolyte is a component used in a case in which the porous resin formed by the liquid composition set is used as an insulating layer for a power storage element. Examples of the electrolyte include, but are not limited to, solid electrolytes soluble in the solvent X and the solvent Y, and liquid electrolytes such as ionic liquids. When the electrolyte is contained in the liquid composition X or the liquid composition Y residual components including the solvent X, the solvent Y, and the electrolyte remaining after formation of the porous resin can function as the electrolytic solution in the power storage element. Thus, some processes can be omitted such as a process (e.g., heating process) of removing the solvent X and the solvent Y after formation of the porous resin and another process of separately impregnating the porous resin with the electrolytic solution.

In a case in which the heating process is omitted, damage to the porous resin and damage to components other than the porous resin (e.g., electrode substrate, active material layer), which may be caused by heating, can be suppressed. As damage to the porous resin is suppressed, a short circuit in the power storage element and reaction unevenness at the time of driving the power storage element are suppressed, and the performance of the power storage element is further improved.

Even when the heating process is performed as the process of removing the solvent X and the solvent Y, the solvent X and the solvent Y may partially remain in the porous body. Such residual solvent X and solvent Y may generate gas due to an unexpected side reaction inside the power storage element and degrade the performance of the power storage element. When the solvent X and solvent Y are usable as components of the electrolyte solution (e.g., components that hardly degrade the performance of the power storage element due to a side reaction), degradation of the performance can be suppressed.

The solid electrolytes are not particularly limited as long as they are soluble in the solvent X and the solvent Y Examples thereof include, but are not limited to, inorganic ion salts such as alkali metal salts and alkali-earth metal salts; quaternary ammonium salts; and supporting salts of acids and bases. Specific examples thereof include, but are not limited to, $LiClO_4$, $LiBF_4$, $LiAsF_6$, $LiPF_6$, $LiCF_3SO_3$, $LiCF_3COO$, $KCl$, $NaClO_3$, $NaCl$, $NaBF_4$, $NaSCN$, $KBF_4$, $Mg(ClO_4)_2$, and $Mg(BF_4)_2$.

Examples of the liquid electrolytes include various ionic liquids containing a cationic component and an anionic component. The ionic liquids are preferably those capable of maintaining in a liquid state in a wide temperature range including room temperature.

Specific examples of the cationic component include, but are not limited to, imidazole derivatives (e.g., N,N-dimethylimidazole salt, N,N-methylethylimidazole salt, N,N-methylpropylimidazole salt), aromatic salts of pyridinium derivatives (e.g., N,N-dimethylpyridinium salt, N,N-methylpropylpyridinium salt), and aliphatic quaternary ammonium compounds such as tetraaklammonium compounds (e.g., trimethylpropylammonium salt, trimethylhexylammonitun salt, triethylhexylammonium salt).

For stability in the atmosphere, specific preferred examples of the anionic component include, but are not limited to, fluorine-containing compounds such as $BF_4^-$, $CF_3SO_3^-$, $PF_4^-$, $(CF_3SO_2)_2N^-$, and $B(CN_4)^-$.

The amount of the electrolyte in the electrolytic solution is not particularly limited and can be suitably selected to suit to a particular application, but is preferably from 0.7 to 4.0 mol/L, more preferably from 1.0 to 3.0 mol/L, and particularly preferably from 1.0 to 2.5 mol/L, for achieving a good balance between the capacity and the output of the power storage element.

Application for White Ink

The liquid composition set of the present disclosure becomes white upon removal of the solvent X and the solvent Y after formation of the porous resin. Therefore, the liquid composition set of the present disclosure can be used as a liquid composition for providing a white image on a recording medium. In the present disclosure, the liquid composition set for providing a white image is not particularly limited as long as it is capable of forming a white image. The liquid composition set for providing a white image is also referred to as "white ink" in the present disclosure. The liquid composition se serving as the white ink is not necessarily have white color and include those which have a non-white color (e.g., transparent or a color other than white).

Generally, white inks containing an inorganic pigment (e.g., titanium oxide) as a coloring material are known. However, such white inks have drawbacks that sedimentation is likely to occur due to the large specific gravity of the coloring material and that storage stability and discharge stability are poor. In this regard, the white ink of the present disclosure can exhibit white color even without containing a white coloring material such as a pigment or a dye, and thereby improves storage stability and discharge stability. The white ink of the present disclosure may contain a white coloring material, but is preferably substantially free of white coloring material. In the case in which the white ink is substantially free of white coloring material, the proportion of the white coloring material in the white ink is preferably 0.1% by mass or less, more preferably 0.05% by mass or less, even more preferably 0.01% by mass or less, and still more preferably equal to or less than the detection limit. Particularly preferably, any white coloring material is not contained. As described above, since the white ink is substantially free of White coloring material, a white image formed by the white ink has a reduced weight. Such a white ink can be suitably used for aircraft coating, automobile coating, or the like.

In addition, white inks are known which contain multiple types of polymerizable compounds and become clouded as curing of the polymerizable compounds progresses to cause phase separation of the resulting polymers. However, such white inks have a drawback that the degree of whiteness is low, because the white color is exhibited due to phase separation between the polymers, not due to the presence of the air layer. In this regard, when the liquid composition set of the present disclosure is used as a white ink, white color is exhibited by the porous resin having pores as air layers, exhibiting a high degree of whiteness. Here, the white color is a color referred to as "white" based on conventional wisdom. The whiteness can be evaluated by measuring the lightness (L*) with a spectrocolorimeter such as X-Rite 939. For example, when the white ink is applied at a duty of 100% or more or in an amount sufficient to cover the surface of a recording medium, the lightness (L*) and the chromaticities (a*, b*) preferably satisfy $70 \leq L^* \leq 100$, $-4.5 \leq a^* \leq -2$, and $-6 \leq b^* \leq 2.5$.

The white ink of the present disclosure forms a layer formed of a porous resin when applied onto a recording medium. Thus, the white ink may be used as a primer ink for preparing a base layer (i.e., primer layer) that improves fixability of another ink (e.g., ink containing a coloring material) to be applied thereafter.

Generally, when low-permeable substrates or impermeable substrates, such as coated paper, glass substrates, resin film substrates, and metal substrates, are used as recording media, ink fixability to such substrates is low. In this regard, when the white ink (i.e., primer ink) of the present disclosure is used, fixability of the white ink (i.e., primer ink) to low-permeable substrates or impermeable substrates is high, and thus fixability of another ink to be applied onto the base layer later can be improved. Even in a case in which the ink (i.e., ink containing a coloring material) to be applied later is a permeable ink (i.e., water-based ink) that is difficult to be used in combination with low-permeable substrates or impermeable substrates, the coloring material can be fixed to the surface of the porous resin while the ink component is allowed to permeate and diffuse into the porous resin.

In addition, the white ink (i.e., primer ink) forms a receiving layer having white color that can conceal the color or transparency of recording media and can improve the image density of the ink (e.g., ink containing a coloring material) applied later.

Application for Solid Freeform Fabrication

The liquid composition set of the present disclosure forms a porous resin layer having a layer thickness in the height direction, and therefore forms a three-dimensional object by laminating multiple porous resin layers by means of solid freeform fabrication. That is, the liquid composition set of the present disclosure can be used for solid freeform fabrication for fabricating three-dimensional objects. In solid freeform fabrication, there is a general problem that the fabricated three-dimensional object tends to have a distortion caused due to shrinkage on curing. In this regard, the liquid composition set of the present disclosure forms a porous body having a network structure by polymerization-induced phase separation. Therefore, the internal stress during polymerization is relaxed by the network structure, and the distortion due to shrinkage on curing of the fabricated object is suppressed.

Figure 2:
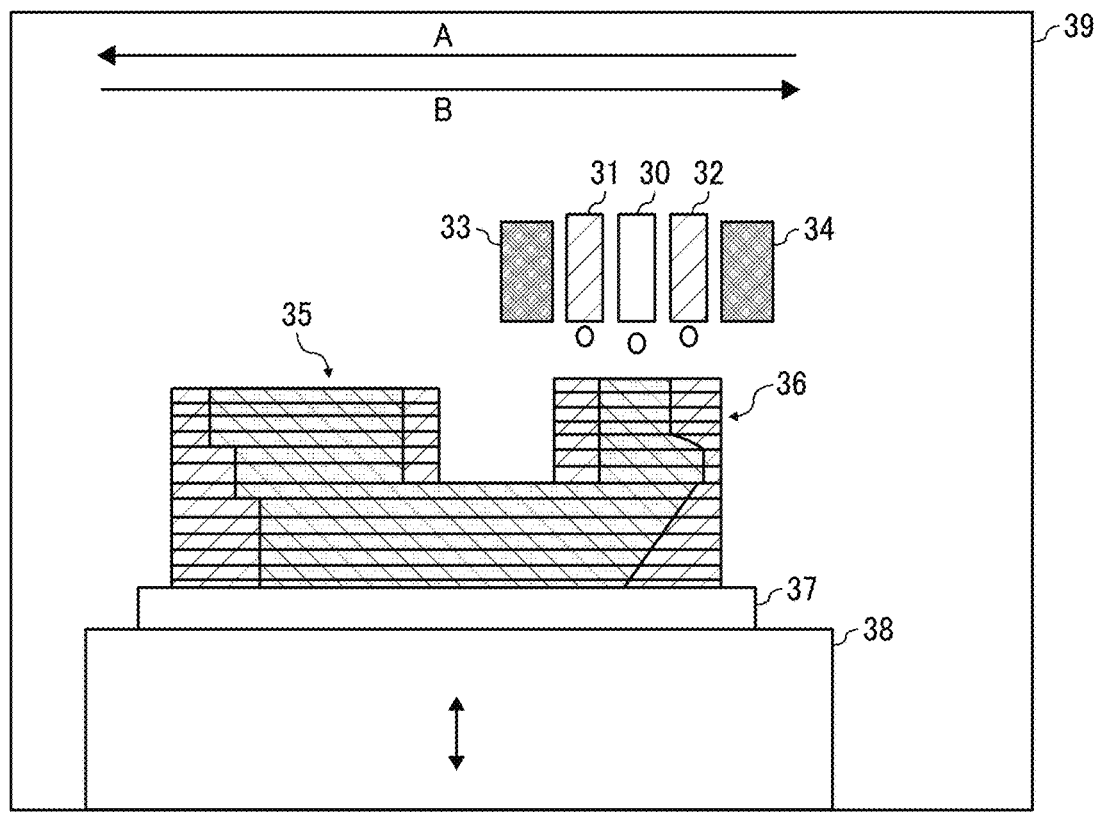
FIG. 2 is a schematic diagram illustrating a material jet fabrication apparatus.

Next, a solid freeform fabrication apparatus (hereinafter "fabrication apparatus") and a solid freeform fabrication method (hereinafter "fabrication method") each for fabricating a three-dimensional object are described with reference to FIG. 2. FIG. 2 is a schematic diagram illustrating a material jest fabrication apparatus. The fabrication apparatus illustrated in FIG. 2 includes a discharge device (serving as an application device) that discharges the liquid composition X and the liquid composition Y by an inkjet method, and a curing device that irradiates the discharged liquid composition X with active energy rays to cure the liquid composition X. In this fabrication apparatus, the discharge device and the curing device sequentially repeat discharge and curing to fabricate a three-dimensional object. The fabrication method performed by the fabrication apparatus illustrated in FIG. 2 includes a discharging process (serving as an application process) of discharging the liquid composition X and the liquid composition Y by an inkjet method, and a curing process of irradiating the discharged liquid composition X with active energy rays to cure the liquid composition X. In this fabrication method, the discharging process and the curing process are sequentially repeated to fabricate a three-dimensional object.

The fabrication apparatus and the fabrication method are described in detail below A fabrication apparatus 39 illustrated in FIG. 2 includes: head units 30, 31, and 32 each movable in the A and B directions and in each of which ink jet heads are arranged; and ultraviolet irradiators 33 and 34 adjacent to each other. The head unit 30 discharges a first solid freeform fabrication composition for fabricating a three-dimensional object. The head units 31 and 32 each discharge a second solid freeform fabrication composition, different from the first solid freeform fabrication composition, for fabricating a support. The discharged solid freeform fabrication compositions are laminated while being cured with ultraviolet irradiation by the ultraviolet irradiators 33 and 34. More specifically, the second solid freeform fabrication composition is discharged from the head units 31 and 32 onto a fabricated object support substrate 37 and irradiated and solidified with active energy rays to form a first support layer having a reservoir, and then the first solid freeform fabrication composition is discharged from the head unit 30 to the reservoir and irradiated and solidified with active energy rays to form a first fabricated object layer. This process is repeated multiple times in accordance with the number of layers to be laminated while lowering a stage 38 movable in the vertical direction, thereby laminating the support layers and the fabricated object layers to fabricate a three-dimensional object 35. A support layer laminate 36 is thereafter removed as needed. The number of the head unit 30 is not limited to only one as illustrated in FIG. 2, and may be two or more.

Application for Laminate

The liquid composition set of the present disclosure can be applied onto various objects (e.g., substrates) to laminate a porous resin layer onto the various objects. Preferably, the liquid composition set of the present disclosure is used to form a laminate comprising an object (e.g., a substrate) and a porous resin layer formed on the object. Specifically, as described above, the liquid composition set may be used for power storage elements or power generation elements, white inks, or solid freeform fabrication. When used for power storage elements or power generation elements, the liquid composition set is applied onto an active material layer to laminate a porous resin layer as an insulating layer thereon. When used for white inks, the liquid composition set is applied onto a recording medium to laminate a porous resin layer as a white image thereon. When used for solid freeform fabrication, the liquid composition set is applied onto a porous resin layer after the curing process to laminate thereon another porous resin layer as a predetermined layer of the solid freeform fabrication product. Generally, there exists an interface between an object (e.g., a substrate) and a layer laminated thereon. As the adhesion at the interface becomes weaker, the object and the layer become more liable to separate from each other. In particular, when the layer to be laminated is formed by a polymerization reaction, the resultant polymer tends to have a distortion, which is likely to cause separation of the layer from the object. In this regard, when the liquid composition set of the present disclosure is used for a laminate, separation of the layer from the object is suppressed. This is because a porous body having a network structure is formed by polymerization-induced phase separation, and the internal stress during polymerization is relaxed by the network structure, thereby suppressing the distortion due to shrinkage on curing of the fabricated object.

Application for Carrier

The liquid composition set of the present disclosure may be mixed with a functional substance to produce a carrier in which the functional substance is carried on the surface of a porous resin. In other words, the liquid composition set of the present disclosure can be used for producing a support carrying a functional substance. Here, the surface of the porous resin refers to not only the outer surface of the porous structure but also the inner surface thereof communicating with the outside. Since the pores communicating with the outside can carry the functional substance, the surface area capable of supporting the functional substance is increased.

The liquid composition set of the present disclosure can improve the degree of freedom in designing carriers in terms of their performances, by appropriately changing the content of the polymerizable compound X, the content of the porogen, the irradiation condition of active energy rays, etc., to adjust the pore size and the porosity. In addition, the liquid composition set of the present disclosure can be applied by various methods, such as inkjet methods, and can improve the degree of freedom in designing carriers in terms of their shapes. Specifically, a carrier can be uniformly formed not only on a flat surface but also on a curved surface without adjusting the shape thereof (by cutting, etc.) according to the shape of the object. It is also possible to form a particulate carrier by discharging the liquid composition by an inkjet method to form liquid droplets, and irradiating with active energy rays the liquid droplets in flight or those independently attached to a substrate.

The functional substance is a substance that directly or indirectly exerts a specific function. Preferably, the functional substance is a substance whose function is increased or improved, when carried on the porous resin, as the area carrying the functional substance increases in the porous resin. More preferably, the carried functional substance is a substance whose function is exerted when located on the outer surface or the inner surface portion which communicates with the outside (in other words, a substance whose function is suppressed when located on the inner surface portion which does not communicate with the outside). The functional substance may be a substance either soluble or dispersible in the liquid composition X or the liquid composition Y, but is preferably a substance dispersible therein. The functional substance is not particularly limited. Examples thereof include, but are not limited to, photocatalysts and physiologically active substances.

The photocatalyst is a substance that exhibits photocatalytic activity when irradiated with light in a specific wavelength range (i.e., excitation light having energy equal to or greater than the band gap between the valence band and the conduction band of the photocatalyst). The photocatalyst exhibits photocatalytic activity to exert various actions such as antibacterial action, deodorant action, and harmful substance (e.g., volatile organic compound (VOC)) decomposition action.

Specific examples of the photocatalyst include, but are not limited to: metal oxides such as anatase-type or rutile-type titanium(IV) oxide ($TiO_2$), tungsten(III) oxide ($W_2O_3$), tungsten(IV) oxide ($WO_2$), tungsten(VI) oxide ($WO_3$), zinc oxide (ZnO), iron(III) oxide ($Fe_2O_3$), strontium titanate ($SiTiO_3$), bismuth(III) oxide ($Bi_2O_3$), bismuth vanadate ($BiVO_4$), tin(II) oxide (SnO), tin(IV) oxide ($SaO_2$), tin(VI) oxide ($SnO_3$), zirconium oxide ($ZrO_2$), cerium(II) oxide (CeO), cerium(IV) oxide ($CeO_2$), barium inmate ($BaTIO_3$), oxide ($In_2O_3$), copper(I) oxide ($Cu_2O$), copper(II) oxide (CuO), potassium tantalate ($KTaO_3$), and potassium niobate ($KNbO_3$); metal sulfides such as cadmium sulfide (CdS), zinc sulfide (ZnS), and indium sulfide (InS) metal selenides such as cadmium selenate ($CdSeO_4$) and zinc selenide (ZnSe); and metal nitrides such as gallium nitride (GaN). Preferably, at least one selected from titanium(IV) oxide ($TiO_2$), tin(IV) oxide ($SnO_2$), tungsten(III) oxide ($W_2O_3$), tungsten(IV) oxide ($WO_2$), and tungsten(VI) oxide ($WO_3$) is included. More preferably, anatase-type titanium(IV) oxide ($TiO_2$) is included.

Physiologically active substances are active ingredients used to exert physiological effects on living bodies. Specific examples thereof include, but are not limited to, low-molecular-weight compounds including pharmaceutical compounds, food compounds, and cosmetic compounds, and high-molecular-compounds including biological polymers such as proteins (e.g., antibodies, enzymes) and nucleic acids (e.g., DNA, RNA). The "physiological effect" is an effect caused by physiological activity exerted by a physiologically active substance at a target site. Examples thereof include, but are not limited to, quantitative and/or qualitative changes or impacts on living bodies, tissues, cells, proteins, DNA, RNA, or the like. The "physiological activity" refers to the ability of a physiologically active substance to give a change or impact on a target site e.g., target tissue). Preferably, the target site is a receptor present on the surface or inside of a cell. In this case, the physiologically active substance binds to a specific protein by physiological activity and an intracellular signal transduction occurs, exerting a physiological effect. The physiologically active substance may be a substance that is converted into the mature form by an enzyme in vivo and then binds to a specific receptor to exert a physiological effect. In this case, in the present disclosure, the substance before converted into the mature form is also included in the meaning of the physiologically active substance. The physiologically active substance may be either a substance produced by an organism (human being or a non-human organism) or an artificially synthesized substance. A sheet-like carrier formed using the liquid composition X or the liquid composition Y containing such a physiologically active substance can be used as a sustained-release sheet that continuously releases a drug for an extended period of time.

Application for Surface Modification

On the outer surface of the porous resin formed by the liquid composition set of the present disclosure, fine irregularities derived from pores are formed, whereby the wettability can be controlled. When the resin constituting the porous resin is hydrophilic, the outer surface of the porous resin can be imparted with a higher hydrophilicity than that of the planar surface formed by the resin. When the resin constituting the porous resin is water-repellent, the outer surface of the porous resin can be imparted with a higher water repellency than that of the planar surface formed by the resin. Accordingly, it is easy to change wettability of the surface of an object by applying the liquid composition set of the present disclosure to the surface of the object to form a surface modification layer.

The liquid composition set of the present disclosure can improve the degree of freedom in designing surface modification layers in terms of their performances, by appropriately changing the content of the polymerizable compound X, the content of the porogen, the irradiation condition of active energy rays, etc., to adjust irregularities formed on the outer surface of the porous resin (depending on the pore size and the porosity). In addition, the liquid composition set of the present disclosure can be applied by various methods, such as inkjet methods, and can improve the degree of freedom in designing surface modification layers in terms of their shapes. Specifically, a surface modification layer can be uniformly formed not only on a flat surface but also on a curved surface.

Application for Separation Layer or Reaction Layer

In a case in which the porous resin formed by the liquid composition set of the present disclosure is permeable to fluids (e.g., liquids and gases), the porous resin can be used as a flow path for fluids. In a case in which the porous resin can be used as a flow path for fluids, the porous resin can be used as a separation layer that separates a specific substance from fluids or a reaction layer (microreactor) that provides a minute reaction field for fluids. In other words, the liquid composition set of the present disclosure can be used for forming a separation layer or a reaction layer. It is preferable that the porous resin used for these applications allow fluids to permeate uniformly and efficiently the inside of the porous structure. The porous resin formed by the liquid composition set of the present disclosure has pores continuously connected to each other, formed by phase separation, which form a structure that allows fluid to uniformly and efficiently permeate.

The case in which the porous resin is permeable to fluids (e.g., liquids and gases) is not particularly limited, but is preferably a case in which the air permeability measured in accordance with Japanese Industrial Standards (JIS) P8117 is 500 seconds/100 mL or less, preferably 300 seconds/100 mL or less. In this case, the air permeability can be measured using a Gurley densometer (product of Toyo Seiki Seisakusho, Ltd.).

Here, the "separation" refers to removal or condensation of a specific substance contained in a mixture as a fluid. The "removal" is not limited to the case in which the specific substance is completely removed from the mixture as a fluid and may be the case where a part thereof is removed.

The reaction field refers to a place where a specific chemical reaction proceeds when a specific substance contained in the fluid passes through.

When used for a separation layer, the polymerizable compound X contained in the liquid composition X of the present disclosure preferably has a functional group capable of interacting with a specific substance contained in the fluid. In the porous resin formed by the liquid composition set containing the liquid composition X, the functional group capable of interacting with the specific substance is disposed on the surface (e.g., inner surface and outer surface) of the porous structure, which enables effective separation of the specific substance. The polymerizable compound X having a functional group capable of interacting with a specific substance contained in the fluid may account for either a part or all of the polymerizable compound X contained in the liquid composition. In the present disclosure, the case in which the functional group is capable of interacting with a specific substance includes both a case in which the functional group itself is capable of interacting with a specific substance and a case in which the functional group becomes capable of interacting with a specific substance by an additional graft polymerization.

When used for a reaction layer, the polymerizable compound X contained in the liquid composition X of the present disclosure preferably has a functional group that provides a reaction field for the fluid. In the porous resin formed by the liquid composition set containing the liquid composition X, the functional group that provides a reaction field for the fluid is disposed on the surface (e.g., inner surface and outer surface) of the porous structure, which enables effective provision of the reaction field. The polymerizable compound X having a functional group that provides a reaction field for the fluid may account for either a part or all of the polymerizable compound X contained in the liquid composition. In the present disclosure, the case in which the functional group provides a reaction field for the fluid includes both a case in which the functional group itself is capable of providing a reaction field for the fluid and a case in which the functional group becomes capable of providing a reaction field for the fluid by an additional graft polymerization.

The separation layer and the reaction layer may be formed by filling a container capable of forming a fluid inflow portion and a fluid outflow portion (e.g., glass tubes) with the liquid composition X and the liquid composition Y and curing the liquid compositions. In addition, by depositing the liquid composition X and the liquid composition Y onto a substrate by means of printing (e.g., inkjet printing), the separation layer or reaction layer is formed (drawn) with the porous resin to have a flow path of a desired shape. The flow path of the separation layer or reaction layer is variable by means of printing in accordance with a particular application.

The liquid composition set of the present disclosure can improve the degree of freedom in designing separation layers and reaction layers in terms of their performances, by appropriately changing the content of the polymerizable compound X, the content of the porogen, the irradiation condition of active energy rays, etc., to adjust the pore size and the porosity of the porous resin.

EXAMPLES

Further understanding of the present disclosure can be obtained by reference to certain specific examples provided herein below for the purpose of illustration only and are not intended to be limiting.

Example 1

The liquid composition X and the liquid composition Y were prepared by mixing materials in the proportions described below. In the following Examples, the liquid composition Y to be applied first may be referred to as a pre-coating liquid, and the liquid composition X to be applied later is referred to as a post-coating liquid.

Liquid Composition X (Post-coating Liquid)
- Polymerizable compound X (tricyclodecane dimethanol diacrylate, product of DAICEL-ALLNEX LTD.): 29.0% by mass
- Solvent X (dipropylene glycol monomethyl ether, product of Kanto Chemical Co., Inc.): 69.9% by mass
- Polymerization initiator (IRGACURE 184, product of BASF): 1.0% by mass
- Surfactant (MEGAFACE F477, product of DIC Corporation): 0.1% by mass Liquid Composition Y (Pre-coating Liquid)
- Solvent Y (dipropylene glycol monomethyl ether, product of Kanto Chemical Co., Inc.): 100.0% by mass Other Examples and Comparative Examples In each of Examples and Comparative Examples, the liquid composition X and the liquid composition Y were prepared in the same manner as in Example 1 except for changing the compositions in accordance with Table 1. In Table 1, the unit for each numerical value of the compositions is "% by mass". In Comparative Example 3, only the liquid composition X was prepared, and the liquid composition Y was not prepared.

In each of Examples and Comparative Examples, the liquid composition X was subjected to evaluations of the light transmittance and haze change rate.

In each of Examples and Comparative Examples, the liquid composition X and the liquid composition Y were subjected to evaluations of the viscosity, surface tension, and specific gravity.

Light Transmittance

In each of Examples and Comparative Examples, the prepared liquid composition X was subjected to measurement of light transmittance as follows.

First, the prepared liquid composition X was injected into a quartz cell, and the transmittance of light (i.e., visible light) at a wavelength of 550 nm of the liquid composition X was measured while stirring the liquid composition X using a stirrer at 300 rpm. In Examples and Comparative Examples, when the light transmittance was 30% or more, it was determined that the polymerizable compound X and the porogen were in a compatible state, and when the light transmittance was less than 30%, it was determined that the polymerizable compound X and the porogen were in an incompatible state. Various conditions for measuring the light transmittance are as described below.
- Quartz cell.: Special microcell with screw cap (trade name: M25-UV-2)
- Transmittance measuring instrument: USB 4000, product of Ocean Optics, Inc.
- Stirring speed: 300 rpm
- Measurement wavelength: 550 nm
- Reference: Light transmittance at a wavelength of 550 nm measured and acquired with the quartz cell filled with the air (i.e., transmittance of 100%)

The measurement results of light transmittance are presented in Table 1 according to the following evaluation criteria.

Evaluation Criteria
- a: The light transmittance is 30% or more.
- b: The light transmittance is less than 30%.

Haze Change Rate

In each of Examples and Comparative Examples, a haze measuring element was prepared using the liquid composition X, and the haze value was measured.

Preparation of Haze Measuring Element

First, fine resin particles were uniformly dispersed on a non-alkali glass substrate by spin coating to form a gap agent. Subsequently, the substrate to which the gap agent had been applied and another non-alkali glass substrate to which no imp agent had been applied were brought to bond to each other in a manner that the two substrates come to sandwich the surface coated with the gap agent After that, the prepared liquid composition X was made to fill the space between the bonded substrates by utilizing a capillary action, thus producing a "pre-UV irradiation haze measuring element". Subsequently, the pre-UV irradiation haze measuring element was irradiated with UV to cure the liquid composition X. Finally, the peripheries of the substrates were sealed with a sealing agent, thus producing a "haze measuring element". Various production conditions are described below.
- Non-alkali glass substrate: OA-10G, product of Nippon Electric Glass Co., Ltd., 40 mm t=0.7 mm
- Gap agent: Fine resin particles MICROPEARL GS-L100, having an average particle diameter of 100 μm
- Spin coating conditions: The amount of dispersion droplets is 150 μL, rotation speed is 1000 rpm, and rotation time is 30 s.
- Amount of liquid composition X filled: 160 μL
- UV irradiation conditions: The light source is UV-LED, the light source wavelength is 365 nm, the irradiation intensity is 30 mW/cm$^2$, and the irradiation time is 20 s.
- Sealing agent: TB3035B (product of ThreeBond Group)

Measurement of Haze Value

Next, the haze values of the above-produced pre-UV irradiation haze measuring element and haze measuring element were measured. The measured haze value of the pre-UV irradiation haze measuring element was set as a reference (i.e., the haze value was 0). The increasing rate ("haze increasing rate") of the measured haze value of the haze measuring element with respect to the measured haze value of the pre-UV irradiation haze measuring element was calculated. In Examples and Comparative Example, when the haze increasing rate was 1.0% or more, it was determined that the resin X and the porogen were in an incompatible state, and when the haze increasing rate was less than 1.0%, it was determined that the resin X and the porogen were in a compatible state. An instrument used for the measurement is as follows.
- Haze meter NDH5000, product of NIPPON DENSHOKU INDUSTRIES CO., LTD.

The measurement results of haze increasing rate are presented in Table 1 according to the following evaluation criteria.

Evaluation Criteria
- a: The haze increasing rate is 1.0% or more.
- b: The haze increasing rate is less than 1.0%.

Viscosity

In each of Examples and Comparative Examples, the viscosities at 25° C. of the liquid composition X and the liquid composition Y were measured using a viscometer (RE-550L, product of Toki Sangyo Co., Ltd.). The measurement results of viscosity are presented in Table 1 according to the following evaluation criteria.

Evaluation Criteria
- a: The viscosity is 30.0 mPa·s or less.
- b: The viscosity is greater than 30.0 mPa·s.

Surface Tension

In each of Examples and Comparative Examples, the surface tensions at 2.5° C. of the liquid composition X and the liquid composition Y were measured using a dynamic surface tensiometer (Portable Dynamic Surface Tensiometer DynoTester, product of SITA). The measurement results of surface tension are presented in Table 1 according to the following evaluation criteria.

Evaluation Criteria
- a: The surface tension of the liquid composition X is smaller than the surface tension of the liquid composition Y
- b: The surface tension of the liquid composition X is equal to or greater than the surface tension of the liquid composition Y Specific Gravity In each of Examples and Comparative Examples, the specific gravities at 2.5° C. of the liquid composition X and the liquid composition Y were measured using a specific gravity measuring instrument (AUW 120D, product of Shimadzu Corporation). The measurement results of specific gravity are presented in Table 1 according to the following evaluation criteria.

Evaluation Criteria
- a: The specific gravity of the liquid composition X is smaller than the specific gravity of the liquid composition Y.
- b: The specific gravity of the liquid composition X is equal to or greater than the specific gravity of the liquid composition Y.

more. With these conditions, the liquid composition X in each of Examples 1 to 4 was able to form a porous resin by itself.

Next, in each of Examples and Comparative Examples, a negative electrode for a power storage element having, as a separator, a porous resin formed using the liquid composition set of was prepared. After that, the shape (i.e., layer thickness) and surface uniformity presence or absence of exposure of the base) of the formed porous resin were evaluated.

Preparation of Negative Electrode Integrated with Porous Resin

Preparation of Negative Electrode

A negative electrode active material dispersion was prepared by uniformly dispersing in water 97.0 parts by mass of graphite particles (having an average particle diameter of 10 μm) as a negative electrode active material, 1.0 part by mass of cellulose as a thickener, and 2.0 parts by mass of an acrylic resin as a binder. This dispersion was applied onto a copper foil having a thickness of 8 μm, serving as a negative electrode substrate, and the resulted coating film was dried at 120° C. for 10 minutes and pressed, thus forming an electrode mixture part having a thickness of 60 μm. The electrode mixture part was cut out to a piece of 50 mm×33 mm to prepare a negative electrode.

Preparation of Separator

In each of Examples and Comparative Examples, the liquid composition X and the liquid composition Y of the liquid composition set were installed in an inkjet discharge device equipped with a GENS head (manufactured by Ricoh Printing Systems, Ltd.). The liquid composition Y was

TABLE 1

| | | Liquid Composition X (Post-coating Liquid) | | | | | | |
|---|---|---|---|---|---|---|---|---|
| | | Examples | | | | Comparative Examples | | |
| | | 1 | 2 | 3 | 4 | 1 | 2 | 3 |
| Polymerizable Compound | Tricyclodecane dimethanol diacrylate | 29.0 | 29.0 | 29.0 | 29.0 | 29.0 | 29.0 | 29.0 |
| Solvent X (Porogen) | Dipropylene glycol monomethyl ether | 69.9 | 69.0 | 35.0 | 21.0 | 70.0 | 69.9 | 69.95 |
| | 2-Propanol | | | 35.0 | 49.0 | | | |
| Polymerization Initiator | IRGACURE 184 | 1.0 | 1.0 | 1.0 | 1.0 | 1.0 | 1.0 | 1.0 |
| Surfactant | MEGAFACE F477 | 0.1 | 1.0 | | | | 0.1 | 0.05 |
| Evaluation of Liquid Composition X | Light Transmittance | a | a | a | a | a | a | a |
| | Haze Change Rate | a | a | a | a | a | a | a |
| | Viscosity | a | a | a | a | a | a | a |

| | | Liquid Composition Y (Pre-coating Liquid) | | | | | | |
|---|---|---|---|---|---|---|---|---|
| | | Examples | | | | Comparative Examples | | |
| | | 1 | 2 | 3 | 4 | 1 | 2 | 3 |
| Solvent Y | Dipropylene glycol monomethyl ether | 100.0 | 100.0 | 100.0 | 100.0 | 100.0 | | |
| | 2-Propanol | | | | | | 100.0 | |
| Evaluation of Liquid Composition Y | Viscosity | a | a | a | a | a | a | |
| Evaluation of Both Liquid Compositions X and Y | Surface Tension | a | a | a | a | b | b | |
| | Specific Gravity | b | b | a | a | b | a | |

As clear from Table 1, with respect to the liquid composition X in each of Examples 1 to 4, the light transmittance was 30% or more and the haze increasing rate was 1.0% or discharged onto the above-prepared negative electrode to form a solid image-like coating region. Immediately after that, the liquid composition X was discharged to form another solid image-like coating region so as to overlap the above-formed coating region on the negative electrode. Immediately after that, in an $N_2$ atmosphere, the coating region was irradiated with UV (light source: UV-LED (FJ800, product of Phoseon Technology), wavelength: 365 nm, irradiation intensity: 30 mW/cm², irradiation time: 20 s) to be cured. Next, the cured product was heated at 120° C. for 1 minute using a hot plate to remove the solvent X and the solvent Y, thus obtaining the negative electrode integrated with a porous resin serving as a separator.

In each of Examples, the porous resin formed on the negative electrode using the liquid composition set was observed to have pores having a pore diameter of 0.01 μm or more and 10 μm or less, a porosity of 30.0% or more, and a bicontinuous structure in which multiple pores were continuously connected to each other.

Shape (Layer Thickness) of Porous Resin

The layer thickness of the porous resin formed on the negative electrode was measured. The used layer thickness measuring instrument was MDH-25MB (product of Mitutoyo Corporation). The layer thickness of the porous resin here refers to the layer thickness of a region where the porous resin is formed excluding a portion where both the negative electrode active material and the porous resin are present. The measurement results of the layer thickness of the porous resin, with comparison with the layer thickness of a reference, are presented in Table 2 according to the following evaluation criteria. The reference is a porous resin formed in the same manner as in "Preparation of Separator" described above except that only the liquid composition X was discharged to a discharge target and the negative electrode as the discharge target was replaced with a copper foil.

Evaluation Criteria
 a: The layer thickness of the porous resin formed on the negative electrode is 95% or more of the layer thickness of the reference.
 b: The layer thickness of the porous resin formed on the negative electrode is less than 95% of the layer thickness of the reference.

Surface Uniformity (Presence or Absence of Exposure of Base) of Porous Resin

The surface of the porous resin formed on the negative electrode was visually observed to confirm whether the negative electrode active material as the base was exposed or not to evaluate surface uniformity of the porous resin. The observation results are presented in Table 2 according to the following evaluation criteria.

Evaluation Criteria
 a: No exposure of the negative electrode active material is observed at the surface of the porous resin.
 b: Exposure of the negative electrode active material is observed at the surface of the porous resin.

Next, in each of Examples and Comparative Examples, a power storage element having, as a separator, a porous resin formed using the liquid composition set of was prepared. After that, the charge capacity of the prepared power storage element was evaluated.

Preparation of Power Storage Element

Into a can (Type 2032, product of Hohsen Corp.) for manufacturing a coin-type power storage element, a 0.2 mm-thick lithium metal plate, the above-prepared negative electrode integrated with the porous resin, and a nonaqueous electrolytic solution were put. The can was then crimped by a crimper (product of Hohsen Corp.) to prepare a power storage element. The electrolytic solution used was a 1.5 mol/L solution of $LiPF_6$ as an electrolyte in a mixture of ethyene carbonate (EC) and dimethyl carbonate (DMC) (mass ratio EC:DMC=1:1).

Charge Capacity

As the first charging, the power storage element was charged to an end-of-charge voltage of 0.05 V with a constant current of 6.4 mA/cm² at room temperature (25° C.). After the first charging, the power storage element was discharged to 2.5 V with a constant current of 6.4 mA/cm², thus performed an initial charging-discharging. After the initial charging-discharging, the power storage element was charged to a voltage of 0.05 V with a constant current of 6.4 mA/cm² at room temperature (25° C.). At this time, the charge capacity per unit area of the negative electrode was measured using a charge-discharge test system (TOSCAT 3001, product of TOYO SYSTEM CO., LTD.). The charge capacity obtained in the second charging was taken as the charge capacity of the negative electrode. The measurement results of the charge capacity, with comparison with the charge capacity of the reference, are presented in Table 2 according to the following evaluation criteria. The reference here was a power storage element prepared in the same manner as above except that the negative electrode integrated with the porous resin was replaced with the negative electrode before being integrated with the porous resin and that a commercially-available separator (i.e., a glass-fiber separator having a thickness of 0.38 mm, GA-100 GLASS FIBER FILTER, product of ADVANTEC) was used.

Evaluation Criteria
 a: The charge capacity of the power storage element is 90% or more of the charge capacity of the reference.
 b: The charge capacity of the power storage element is less than 90% of the charge capacity of the reference.
 Impossible to evaluate. (Because the negative electrode active material as the base is exposed from the separator and a power storage element is not established.)

TABLE 2

| | Porous Resin | | |
|---|---|---|---|
| | Shape (Layer Thickness) | Surface Uniformity (Exposure of Base) | Power Storage Element Charge Capacity |
| Example 1 | b | a | b |
| Example 2 | b | a | b |
| Example 3 | a | a | a |
| Example 4 | a | a | a |
| Comparative Example 1 | b | b | — |
| Comparative Example 2 | a | b | — |
| Comparative Example 3 | b | b | — |

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid composition set, comprising:
 a liquid composition X comprising a polymerizable compound X and a solvent X; and
 a liquid composition Y comprising a solvent Y,
 wherein the liquid composition X is to form a porous resin, the liquid composition X has a smaller surface tension than the liquid composition Y, and the liquid composition X and the liquid composition Y are separate.

2. The liquid composition set according to claim 1, wherein the liquid composition X has a light transmittance of 30% or more at a wavelength of 550 nm, the light transmittance measured while the liquid composition X is being stirred, and wherein a haze measuring element produced from the liquid composition X has a haze increasing rate of 1.0% or more with respect to a measured haze value of a pre-UV-irradiation haze measuring element.

3. The liquid composition set according to claim 1, wherein the polymerizable compound X has two or more unsaturated hydrocarbon groups.

4. The liquid composition set according to claim 1, wherein the polymerizable compound X has a (meth)acryloyl group or a vinyl group.

5. The liquid composition set according to claim 1, wherein the solvent X and the solvent Y each independently have a boiling point of from 50° C. to 250° C.

6. The liquid composition set according to claim 1, wherein the polymerizable compound X accounts for 10.0% to 50.0% by mass of the liquid composition X, and the solvent X accounts for 50.0% to 90.0% by mass of the liquid composition X.

7. The liquid composition set according to claim 1, wherein the liquid composition X and the liquid composition Y each independently have a viscosity of from 1.0 to 150.0 mPa's at 25° C.

8. The liquid composition set according to claim 1, wherein the liquid composition Y is substantially free of polymerizable compound.

9. The liquid composition set according to claim 1, wherein the liquid composition X further comprises a surfactant.

10. The liquid composition set according to claim 1, wherein the liquid composition X has a smaller specific gravity than the liquid composition Y.

11. The liquid composition set according to claim 1, wherein the liquid composition X is to be applied to a region to which the liquid composition Y has been applied.

12. The liquid composition set according to claim 1, wherein the porous resin has pores having a pore diameter of from 0.01 to 10 μm.

13. The liquid composition set according to claim 1, wherein the porous resin has a porosity of 30% or more.

14. The liquid composition set according to claim 1, wherein the porous resin has a bicontinuous structure in which multiple pores are continuously connected to each other.

15. The liquid composition set according to claim 1, wherein the liquid composition X has a smaller surface tension than the liquid composition Y by 0.3 mN/m or more.

16. The liquid composition set according to claim 1, wherein the liquid composition X has a smaller specific gravity than the liquid composition Y by 0.01 or more.

17. The liquid composition set according to claim 1, wherein liquid composition X and the liquid composition Y are each independently present in a liquid state.

* * * * *